(12) United States Patent
Monahan

(10) Patent No.: US 11,618,533 B1
(45) Date of Patent: Apr. 4, 2023

(54) CATAMARAN BOAT HULLS AND METHODS OF MAKING AND USING THE SAME

(71) Applicant: Fish Sean Ventures, LLC, Gainesville, FL (US)

(72) Inventor: Sean Monahan, Gainesville, FL (US)

(73) Assignee: FISH SEAN VENTURES, LLC, Gainesville, FL (US)

( * ) Notice: Subject to any disclaimer, the term of this patent is extended or adjusted under 35 U.S.C. 154(b) by 0 days.

(21) Appl. No.: 17/893,576

(22) Filed: Aug. 23, 2022

(51) Int. Cl.
*B63B 1/04* (2006.01)
*B63B 3/38* (2006.01)

(52) U.S. Cl.
CPC ............... *B63B 1/042* (2013.01); *B63B 3/38* (2013.01)

(58) Field of Classification Search
CPC .. B63B 1/042; B63B 1/10; B63B 3/38; B63B 1/20
See application file for complete search history.

(56) References Cited

U.S. PATENT DOCUMENTS

| 5,630,371 | A | 5/1997 | Morrelli et al. |
| 8,109,221 | B2 | 2/2012 | Graf et al. |
| 8,291,850 | B1 | 10/2012 | Peters |
| 9,038,561 | B2 * | 5/2015 | Loui .................. B63B 1/20 114/291 |
| 10,518,843 | B1 | 12/2019 | Melvin et al. |
| 2011/0056425 | A1 * | 3/2011 | Campbell .............. B63B 1/38 114/289 |

\* cited by examiner

*Primary Examiner* — Anthony D Wiest
(74) *Attorney, Agent, or Firm* — Withers & Keys, LLC

(57) ABSTRACT

Catamaran boat hulls are described having sponsons, an underside tunnel surface between sponsons, two longitudinal steps disposed across each sponson's keel, and two transverse steps disposed lengthwise on opposing sides of each sponson's keel. The longitudinal steps for a sponson have a profile with a curved longitudinal step portion on the opposing outer edges with an outer edge portion of that curved longitudinal step portion being further away from the sponson's aft section, and an inward step edge offset where each of the two longitudinal steps meets a hull side of the sponson. The transverse steps help define variable deadrise inner lifting pad running portion with a lower deadrise aft transitioning to a higher deadrise forward. Spray rails protruding off the aft end of an underside wave splitter and away from the boat hull's centerline help manage undesired spray and use of radiused chines enhances lift and landing performance.

30 Claims, 15 Drawing Sheets

CATAMARAN BOAT HULLS AND METHODS OF MAKING AND USING THE SAME

FIELD OF THE INVENTION

This invention relates to catamaran boat hulls, and methods of making and using catamaran boat hulls. More specifically, the invention relates to features used as part of a powered catamaran boat hull that improves tunnel spray management and various running characteristics.

BACKGROUND

Catamaran boat hulls are commonly known to be used in the power boat market (e.g., fishing vessels) to allow for high performance operating while taking advantage of the stability offered by a dual hull structure (e.g., dual hull sponsons) as well as the ability to operate with a relatively shallow draft when compared to deep-V monohull powerboats of comparable size. While conventional catamaran boat hulls are known to have high performance during operation, conventional catamaran boat hulls still face different types of performance issues that warrant improvements.

For example, conventional catamaran boat hulls, by virtue of their separated hull sponsons, are known to have water pushing inward within the tunnel between the hull sponsons. Such water, during operation of the hull, pushes and rises up where it may often hit the underside bridge deck disposed between the hull sponsons. This causes undesirable slamming loads imparted on the boat hull in operation, especially in less-than-ideal sea conditions. In attempts to address this performance issue, it is common to find conventional catamaran boat hulls having a conventional underside wave splitter (also commonly referred to as a wave buster) to help re-direct such rising water before directly hitting the underside bridge deck.

Conventional catamaran boat hulls are also known to suffer from water trying to exit the front of the tunnel between the hull sponsons. Such water can create a dangerous operation condition as it may adversely impact the occupants/passengers/operators of a catamaran boat hull as such water exiting the front of the tunnel is often known to blow back into the operator and/or other occupants of the catamaran boat.

While a conventional catamaran boat hull is also known to use a stepped hull configuration to help reduce friction on underwater running surfaces, a conventional stepped hull configuration may still be improved to allow for even more enhanced friction resistance on the underwater running surfaces as well as improved tracking of the catamaran boat hull when powered in operation.

Conventional catamaran boat hulls are known to deploy hull sponsons with sharper entry features so as to allow for improved cutting through oncoming sea conditions. However, such sharper entry features (e.g., narrower chines) may impart less-than-desired landings in rough sea conditions.

In summary, there is a need in the art for one or more new catamaran boat hull features that provide one or more advantages over known catamaran boat hulls such as improved tunnel spray management through the tunnel between catamaran boat hull sponsons, improved running characteristics relative to the underside running surfaces of the catamaran boat hull's sponsons, improved boat landing performance, as well as other improved running characteristics (e.g., planing, tracking, and the like).

SUMMARY OF THE INVENTION

The present invention is directed to designs and configurations of catamaran boat hulls to address one or more of such needs. In a first aspect of the disclosure, a catamaran boat hull with improved running characteristics is described where the catamaran boat hull comprises a pair of hull sponsons and an underside tunnel surface. The pair of hull sponsons includes a first and second sponson, wherein the first sponson and the second sponson are disposed in parallel relative to a catamaran boat hull centerline. The underside tunnel surface couples the first sponson to the second sponson, and forms a channel region along the catamaran boat hull centerline and between the first sponson and the second sponson through which water runs when the catamaran boat hull moves through the water. Each of the sponsons includes an aft transom section, a keel, a sponson running surface, two longitudinal steps, and two transverse steps. The keel is oriented along a sponson hull centerline of the particular sponson, and extends from an intersection point with the aft transom section to an upward curving bow. The sponson running surface is disposed on each side of the keel extending from a running surface intersection with the aft transom section to the upward curving bow. In general, the longitudinal steps are disposed at respectively different points along the keel and the sponson running surface, with each of the two longitudinal steps running across a width $W_S$ of the particular sponson. In general, the two transverse steps are disposed lengthwise on opposing sides of the keel, where a first transverse step is disposed between the keel and an inner chine of the particular sponson, and where a second transverse step is disposed between the keel and an outer chine of the particular sponson.

In this first aspect, the two longitudinal steps divide the particular sponson running surface into an aft sponson running surface section, a mid-hull sponson running surface section, and a forward hull sponson running surface section. The mid-hull sponson running surface section is lower than the aft sponson running surface section at a first keel intersection between the aft sponson running surface section and the mid-hull sponson running surface section due to a first of the two longitudinal steps. The forward sponson running surface section is lower than the mid-hull sponson running surface section at a second keel intersection between the forward sponson running surface section and the mid-hull sponson running surface section due to a second of the two longitudinal steps. Further, each of the two longitudinal steps independently has a step surface profile that varies along at least one of (i) a height $H_{LS}$ of each of the two longitudinal steps, and (ii) a length $L_{LS}$ of each of the two longitudinal steps.

In this first aspect, the two transverse steps divide the aft sponson running surface section into an inner lifting pad running portion and two outer running surface portions. The inner lifting pad running portion of the aft sponson running surface is disposed between each of the outer running surface portions of the aft sponson running surface section as separated by each of the two transverse steps. The inner lifting pad running portion has a variable deadrise profile with a lower deadrise at an aft end of the inner lifting pad running portion that transitions to a higher deadrise at a forward end of the inner lifting pad running portion.

In a second aspect of the disclosure, a catamaran boat hull with improved running characteristics is described where the catamaran boat hull comprises a pair of hull sponsons and an underside tunnel surface. The pair of hull sponsons includes a first and second sponson, wherein the first sponson and the second sponson are disposed in parallel relative to a catamaran boat hull centerline. The underside tunnel surface couples the first sponson to the second sponson, and forms a channel region along the catamaran boat hull centerline and between the first sponson and the second sponson through which water runs when the catamaran boat hull moves through the water. Each of the sponsons includes an aft transom section, a keel, a sponson running surface, two longitudinal steps, and two transverse steps.

In this second aspect, the two longitudinal steps divide the sponson running surface into an aft sponson running surface section, a mid-hull sponson running surface section, and a forward hull sponson running surface section. Each of the longitudinal steps has a step edge profile along opposing outer edges of the particular sponson, wherein the step edge profile comprises at least one of (i) a curved longitudinal step portion disposed on the opposing outer edges with an outer edge portion of the curved longitudinal step portion being further away from aft transom section, and (ii) an inward step edge offset where each of the two longitudinal steps meets a side of the respective first sponson and the respective second sponson. In this configuration, at least one of the curved longitudinal step portion and the inward step edge offset provide enhanced air flow into a channel extending along a length $L_{LS}$ of each of the two longitudinal steps.

In this second aspect, the two transverse steps divide the aft sponson running surface section into a variable deadrise inner lifting pad running portion and two outer running surface portions. The variable deadrise inner lifting pad running portion of the aft sponson running surface is disposed between each of the outer running surface portions of the aft sponson running surface section as separated by each of the two transverse steps. The variable deadrise inner lifting pad running portion has a lower deadrise at an aft end of the variable deadrise inner lifting pad running portion that transitions to a higher deadrise at a forward end of the variable deadrise inner lifting pad running portion.

In a third aspect of the disclosure, a catamaran boat hull with improved running characteristics is described where the catamaran boat hull comprises a pair of hull sponsons, an underside tunnel surface, an underside wave splitter, and a set of spray rails. The pair of hull sponsons includes a first and second sponson, where the first sponson and the second sponson are disposed in parallel relative to a catamaran boat hull centerline. The underside tunnel surface couples the first sponson to the second sponson, and forms a channel region along the catamaran boat hull centerline and between the first sponson and the second sponson through which water runs when the catamaran boat hull moves through the water. The underside wave splitter is disposed on the underside tunnel surface along the catamaran boat hull centerline and has a set of downward protruding side surfaces and a protruding aft surface. The set of spray rails is disposed along the underside tunnel surface and aft of the underside wave splitter, where each of the spray rails extends from the protruding aft surface of the underside wave splitter and away from the catamaran boat hull centerline to disrupt spray from moving forward of the underside wave splitter.

In this third aspect, each of the sponsons has an aft transom section, a keel, a sponson running surface, two longitudinal steps, and two transverse steps. The particular sponson's keel is oriented along a sponson hull centerline of the particular sponson and extends from an intersection point with the aft transom section to an upward curving bow.

The sponson running surface is disposed on each side of the keel extending from a running surface intersection with the aft transom section to the upward curving bow. The two longitudinal steps are disposed at respectively different points along the sponson's keel and the sponson running surface such that each of the longitudinal steps is running across a width $W_S$ of the particular sponson. In more detail in this third aspect, the two longitudinal steps divide the sponson running surface into an aft sponson running surface section, a mid-hull sponson running surface section, and a forward hull sponson running surface section. Each of the longitudinal steps has a step edge profile along opposing outer edges of the particular sponson, where the step edge profile comprises at least (i) a curved longitudinal step portion disposed on the opposing outer edges with an outer edge portion of the curved longitudinal step portion being further away from aft transom section, and (ii) an inward step edge offset where each of the two longitudinal steps meets a side of the respective first sponson and the respective second sponson.

The two transverse steps in this third aspect are disposed lengthwise on opposing sides of the keel, where a first transverse step is disposed between the keel and an inner chine of the particular sponson, and where a second transverse step is disposed between the keel and an outer chine of the particular sponson. In more detail, the transverse steps divide the aft sponson running surface section into an inner lifting pad running portion and two outer running surface portions. The inner lifting pad running portion of the aft sponson running surface is disposed between each of the outer running surface portions of the aft sponson running surface section as separated by each of the two transverse steps. This inner lifting pad running portion has a variable deadrise profile with a lower deadrise at an aft end of the inner lifting pad running portion that transitions to a higher deadrise at a forward end of the inner lifting pad running portion.

In a fourth aspect of the disclosure, a catamaran boat hull with improved running characteristics is also described where the catamaran boat hull comprises a pair of hull sponsons and an underside tunnel surface. The pair of hull sponsons includes a first and second sponson, where the first sponson and the second sponson are disposed in parallel relative to a catamaran boat hull centerline. The underside tunnel surface couples the first sponson to the second sponson, and forms a channel region along the catamaran boat hull centerline and between the first sponson and the second sponson through which water runs when the catamaran boat hull moves through the water. Each of the sponsons in this fourth aspect include an aft transom section, a keel, an inner chine, an outer chine, a sponson running surface, two longitudinal steps, and two transverse steps. The keel for a particular sponson is oriented along a sponson hull centerline of that particular sponson and extends from an intersection point with the aft transom section to an upward curving bow. The inner chine is disposed proximate the underside tunnel surface, while the outer chine disposed on an opposite side of the particular sponson than the inner chine. The sponson running surface disposed on each side of the keel for the particular sponson extends from a running surface intersection with the aft transom section to the upward curving bow and, in more detail, has (a) an angled sponson running surface extending along an outer portion of the sponson running surface between (i) the keel and (ii) one of the inner chine or the outer chine for the sponson, (b) an outermost sponson running surface edge adjacent either the inner chine or the outer chine, and (c) a smooth radiused transition between the angled sponson running surface and the outermost sponson running surface edge.

In this fourth aspect, the two longitudinal steps are disposed at respectively different points along the keel and the sponson running surface, with each of the two longitudinal steps running across a width $W_S$ of the particular sponson. The longitudinal steps for the particular sponson divide the sponson running surface for that sponson into an aft sponson running surface section, a mid-hull sponson running surface section, and a forward hull sponson running surface section. Each of the two longitudinal steps has a step edge profile along opposing outer edges of the particular sponson, wherein the step edge profile includes (i) a curved longitudinal step portion disposed on the opposing outer edges with an outer edge portion of the curved longitudinal step portion being further away from aft transom section, and (ii) an inward step edge offset where each of the two longitudinal steps meets a side of the particular sponson.

In this fourth aspect, the two transverse steps are disposed lengthwise on opposing sides of the keel. A first of the transverse steps is disposed between the keel and the inner chine of the particular sponson, while a second of the transverse steps is disposed between the keel and the outer chine of the particular sponson. The transverse steps divide the aft sponson running surface section into an inner lifting pad running portion and two outer running surface portions. The inner lifting pad running portion of the aft sponson running surface is disposed between each of the outer running surface portions of the aft sponson running surface section as separated by each of the two transverse steps. Furthermore, the inner lifting pad running portion has a variable deadrise profile with a lower deadrise at an aft end of the inner lifting pad running portion that transitions to a higher deadrise at a forward end of the inner lifting pad running portion.

Those skilled in the art will appreciate that further aspects of the disclosure describe a catamaran boat hull with improved running characteristics where the catamaran boat hull has one or more of enhanced step shape features described herein, enhanced lifting pad features described herein, wave splitter spray rails described herein, and/or enhanced use of radiused structures as part of the hull's sponsons described herein.

These and other features and advantages of the present invention will become apparent after a review of the following detailed description of the disclosed embodiments, the appended figures, and the appended claims.

BRIEF DESCRIPTION OF THE DRAWINGS

The present invention is further described with respect to embodiments and with reference to the appended figures, wherein.

DETAILED DESCRIPTION OF THE INVENTION

The present invention relates to catamaran boat hulls. Exemplary catamaran boat hulls are shown, for example, in FIGS. 1-18. Such exemplary catamaran boat hulls, methods of making catamaran boat hulls, and methods of using the catamaran boat hulls in accordance with embodiments of the present invention are further described below. The below described embodiments provide an overview intended to provide nonlimiting descriptions of the present subject matter and is not intended to provide an exclusive or exhaustive explanation. The embodiments below provide further information about the catamaran boat hulls and methods of the present invention as described herein. In general, FIGS. 1-11 provide various views of an exemplary catamaran boat hull in accordance with embodiments of the present invention while FIGS. 12-18 provide further details of various embodiments.

Figure 1:
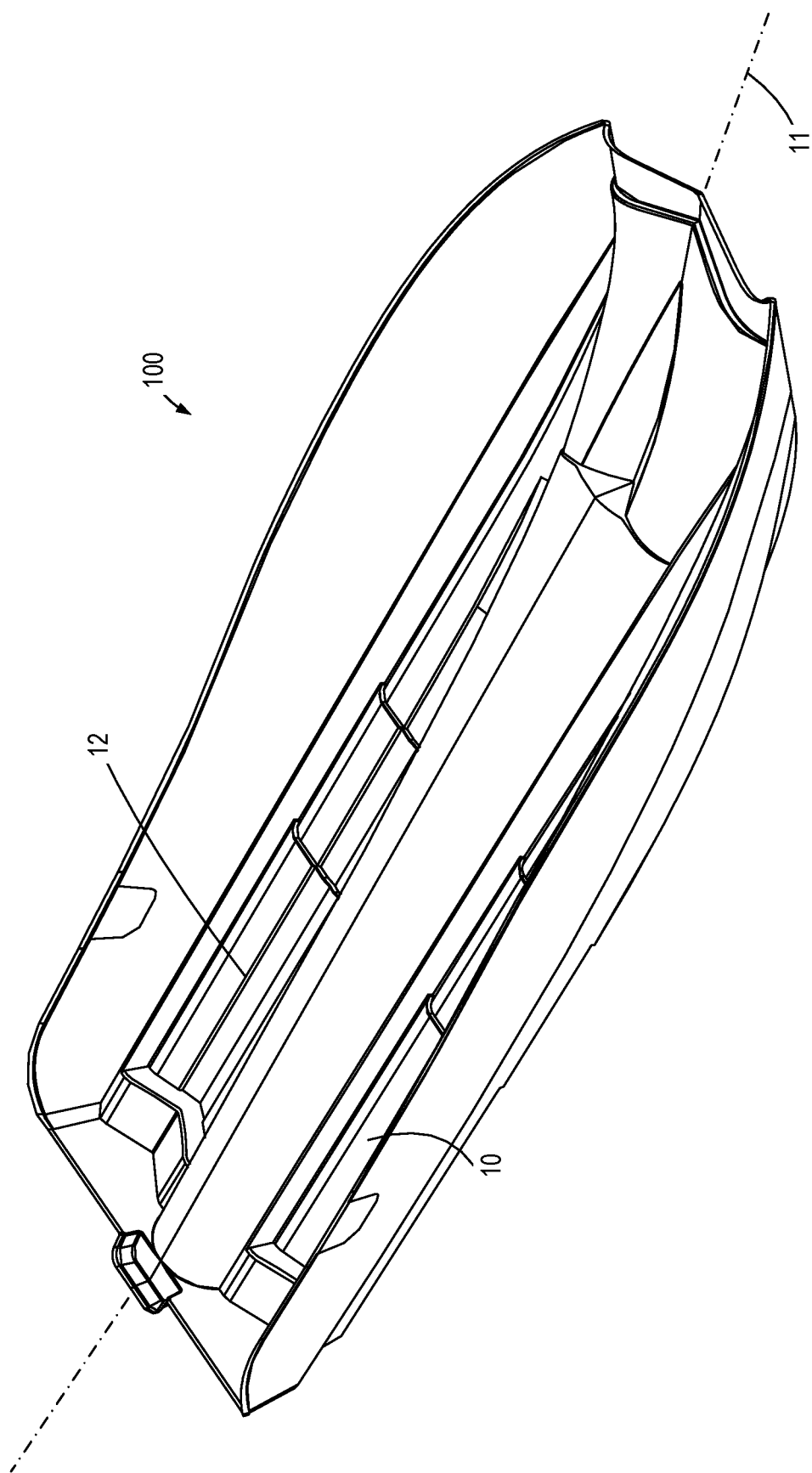
FIG. 1 is a perspective view of an exemplary catamaran boat hull from above the catamaran boat hull in accordance with an embodiment of the present invention.

FIG. 1 is a perspective view of an exemplary catamaran boat hull 100 from above the catamaran boat hull in accordance with an embodiment of the present invention. Referring now to FIG. 1, exemplary catamaran boat hull 100 is shown from above having a pair of exemplary hull sponsons 10/12 including a first sponson 10 and a second sponson 12. Those skilled in the art will appreciate that a multi-hull power boat incorporating exemplary catamaran boat hull 100 would include a top deck structure (not shown), but the views presented in FIGS. 1-11 do not include such top deck structure to simplify viewing aspects of hull 100. Each of the first sponson 10 and the second sponson 12 are disposed in parallel relative to a catamaran boat hull centerline 11.

Figure 2:
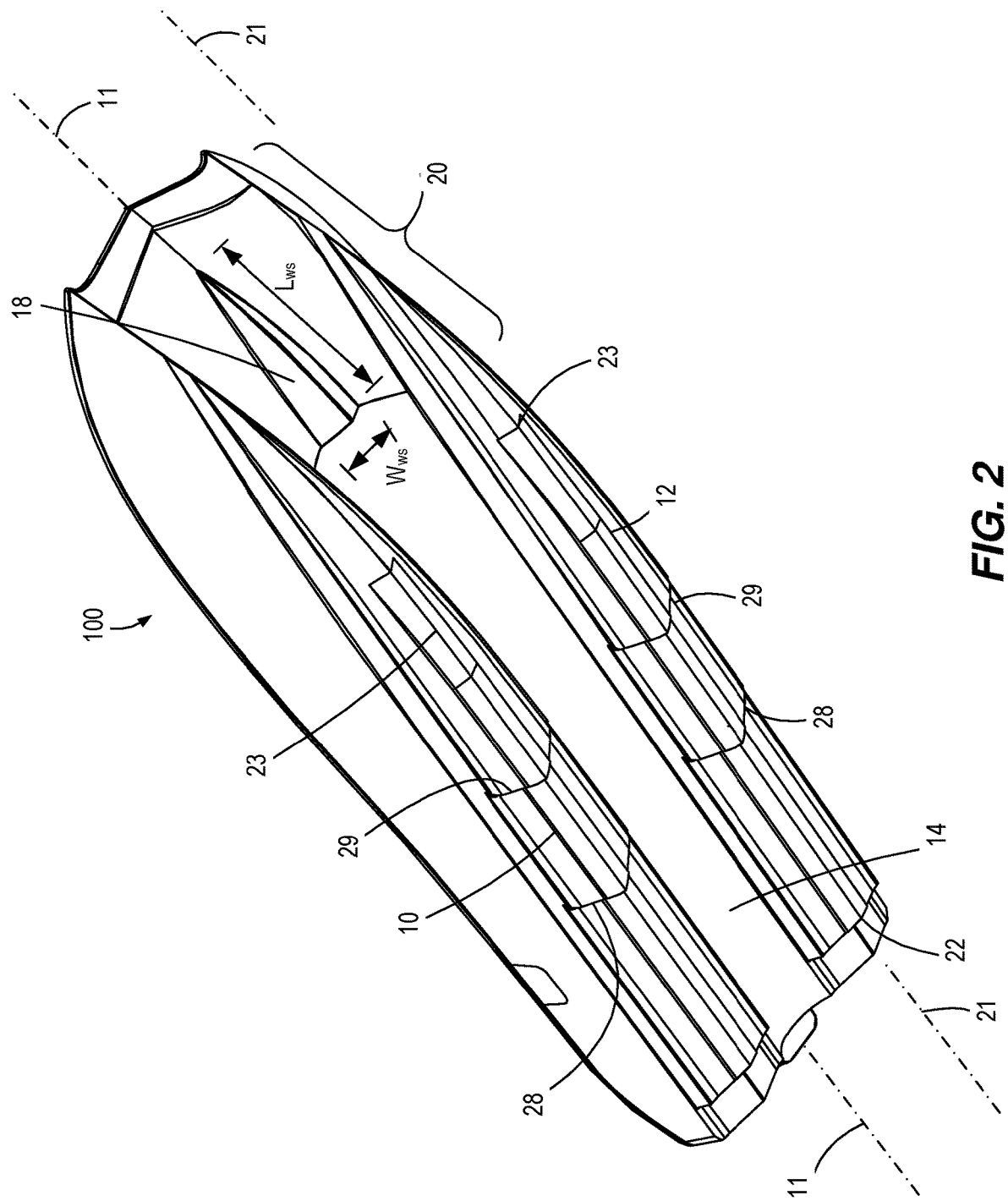
FIG. 2 is a perspective view of the exemplary catamaran boat hull shown in FIG. 1 as viewed from the forward right quadrant of the catamaran boat hull, and below the catamaran boat hull illustrating various hull features in accordance with an embodiment of the present invention.

FIG. 2 is a perspective view of the exemplary catamaran boat hull 100 shown in FIG. 1 as viewed from the forward right quadrant of the catamaran boat hull 100, and below the catamaran boat hull 100 illustrating various hull features in accordance with an embodiment of the present invention. Referring now to FIG. 2, hull 100 further includes an exemplary underside tunnel surface 14 between exemplary sponsons 10/12 forming a channel region 16 along the catamaran boat hull centerline 11 through which water runs when the catamaran boat hull 100 and its sponsons 10/12 moves through the water. As shown in FIG. 2, each of the first sponson 10 and the second sponson 12 includes an aft transom section 22, a keel 23 oriented along the respective sponson's hull centerline, a sponson running surface 26, two longitudinal steps 28/29. The keel 23 extends from an intersection point 24 with the aft transom section 22 to an upward curving bow of that sponson. A sponson running surface 26 disposed on each side of the keel 23 extends from a running surface intersection with the aft transom section 22 to the upward curving bow of that sponson. The two longitudinal steps 28/29, as shown in FIG. 2, are disposed at respectively different points along the keel 23 and the sponson running surface 26 for each of the sponsons 10/12.

Hull 100 further includes an exemplary underside wave splitter 18 (also referred to as a wave buster) disposed on a forward portion 20 of the underside tunnel surface 14 along the catamaran boat hull centerline 11. Those skilled in the art will appreciate that an exemplary underside wave splitter 18 operates as a type of water disruptive structure protruding down from a bridge deck disposed between the hull sponsons 10/12. For example, an embodiment of exemplary underside wave splitter 18 has a set of downward protruding side surfaces 181/182 (shown in more detail in FIG. 12) and a protruding aft surface 183 (shown in more detail in FIG. 12), which help to reduce slamming loads in the tunnel's channel region 16 caused by rough seas. During operation of hull 100, water pushes inward within the tunnel's channel region 16, as a result of the twin hull sponsons 10/12, and the inward pushing water rises up and hits a portion of the underside tunnel surface (also known as the bridge deck between hull sponsons 10/12). To address this issue, exemplary underside wave splitter 18 has the downward protruding side surfaces 181/182 with a sharp deadrise, which helps to re-direct the water before impacting the flat of the underside tunnel surface 14. As will be describe in more detail, exemplary underside wave splitter 18 advantageously also includes a set of exemplary spray rails (shown in more detail as spray rails 13/15 in FIG. 12) disposed along the underside tunnel surface 14. Each of these spray rails extend from the protruding aft surface 183 of the underside wave splitter 18 and away from the catamaran boat hull centerline 11 as structure to help with spray management.

Figure 3:
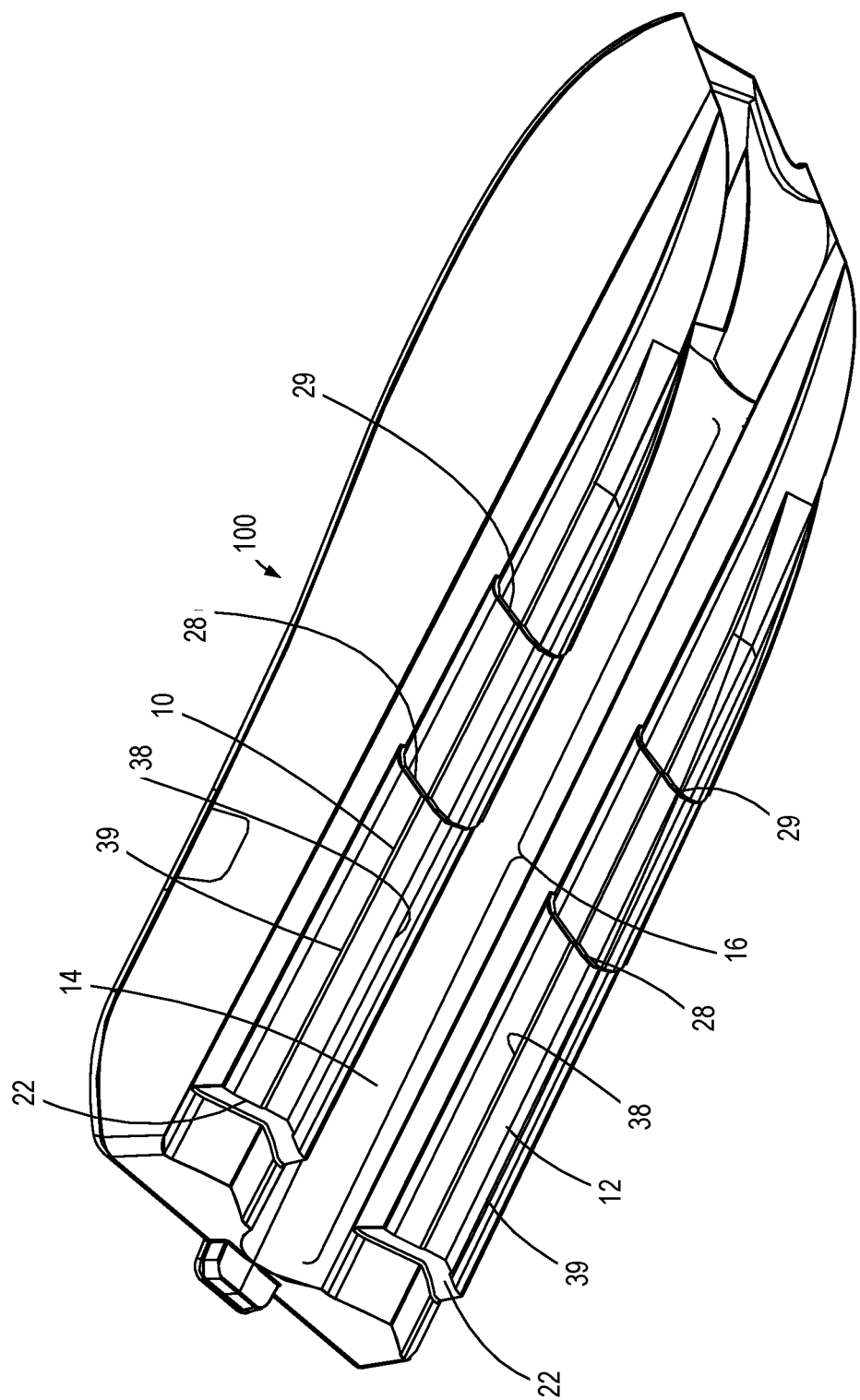
FIG. 3 is a perspective view of the exemplary catamaran boat hull shown in FIG. 1 as viewed from the side right quadrant of the catamaran boat hull but from a further stern vantage point illustrating various catamaran boat hull features with emphasis on both hull and stern features in accordance with an embodiment of the present invention.

FIG. 3 is a perspective view of the exemplary catamaran boat hull 100 shown in FIG. 1 as viewed from the side right quadrant of the catamaran boat hull 100 but from a further stern vantage point illustrating various catamaran boat hull features with emphasis on both hull and stern features in accordance with an embodiment of the present invention. Referring now to FIG. 3, exemplary hull 100 is further shown having two transverse steps 38/39 disposed lengthwise on opposing sides of a sponson's keel 23. One transverse step 38 is disposed between the sponson's keel 23 and an inner chine of the respective sponson 10/12. A second transverse step 39 is disposed between the sponson's keel 23 and an outer chine of the respective sponson 10/12.

Figure 4:
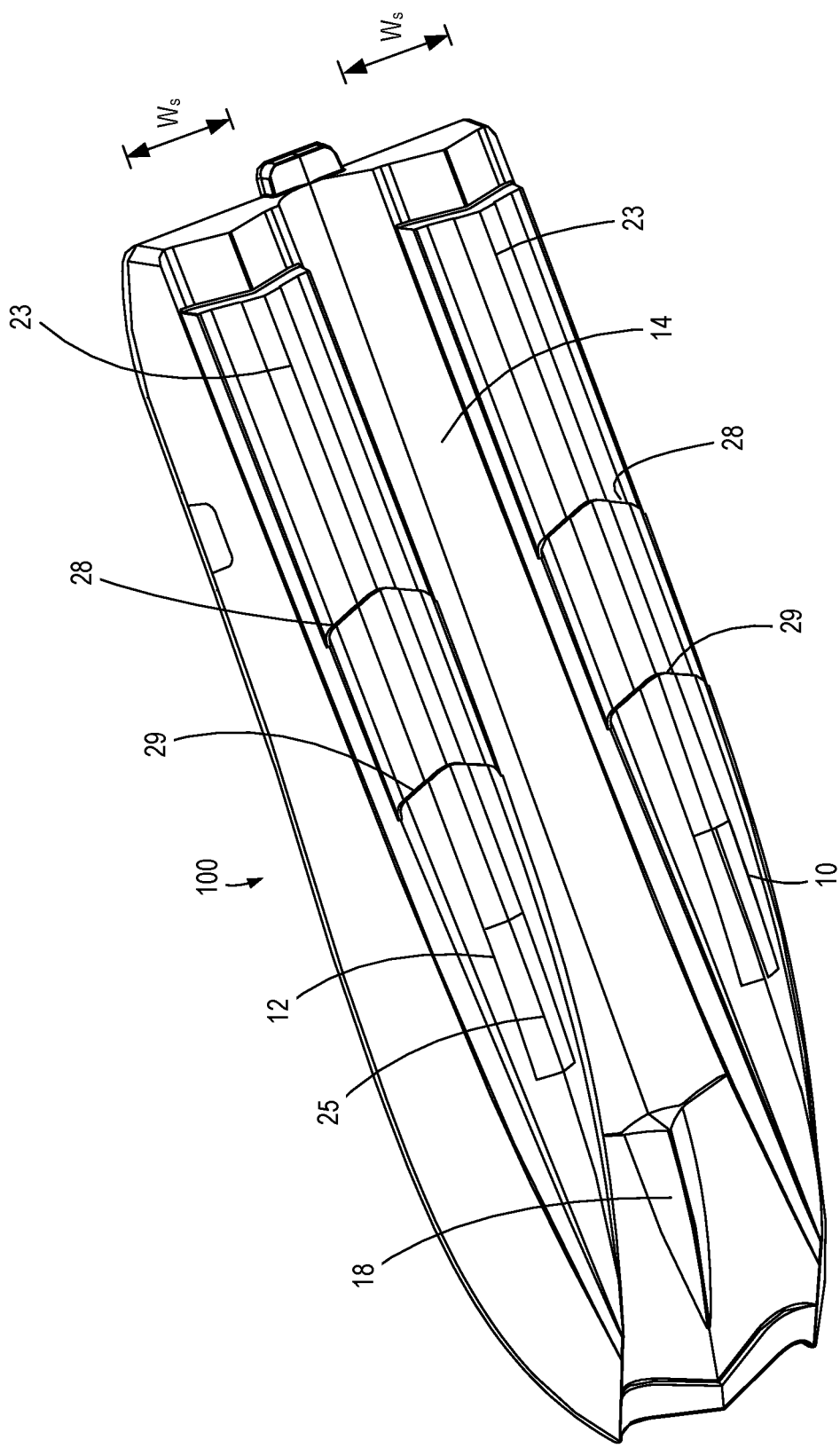
FIG. 4 is a perspective view of the exemplary catamaran boat hull shown in FIG. 1 as viewed from the side left quadrant of the hull but from a similar stern vantage point to the right of the hull illustrating the hull features with emphasis on both hull and stern features in accordance with an embodiment of the present invention.
Figure 5:
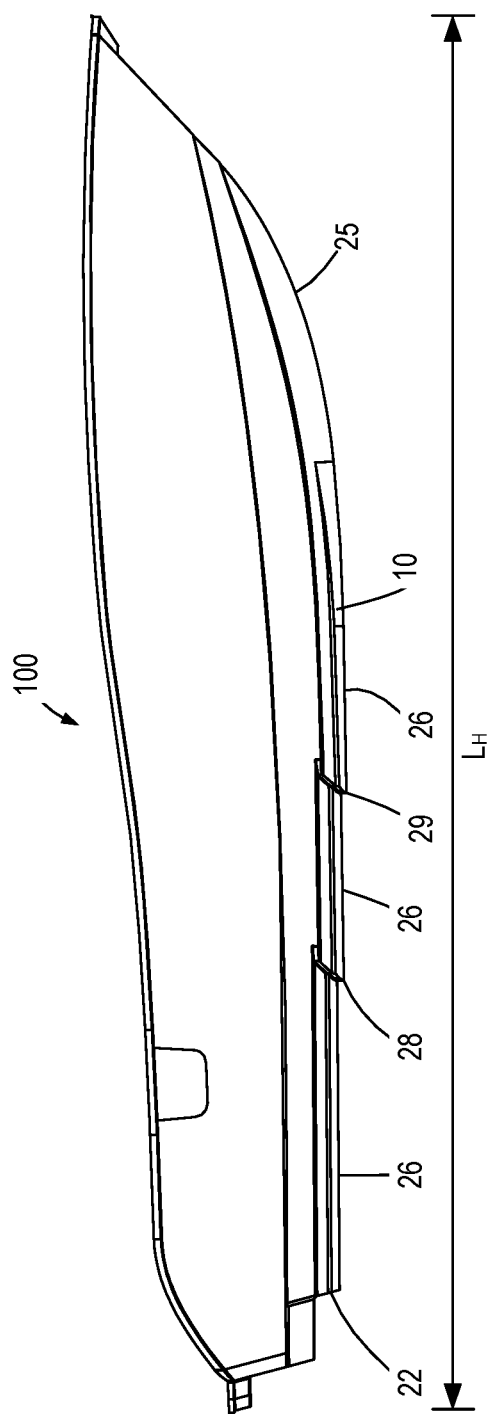
FIG. 5 is a right-side view of the exemplary catamaran boat hull shown in FIG. 1 in accordance with an embodiment of the present invention.
Figure 6:
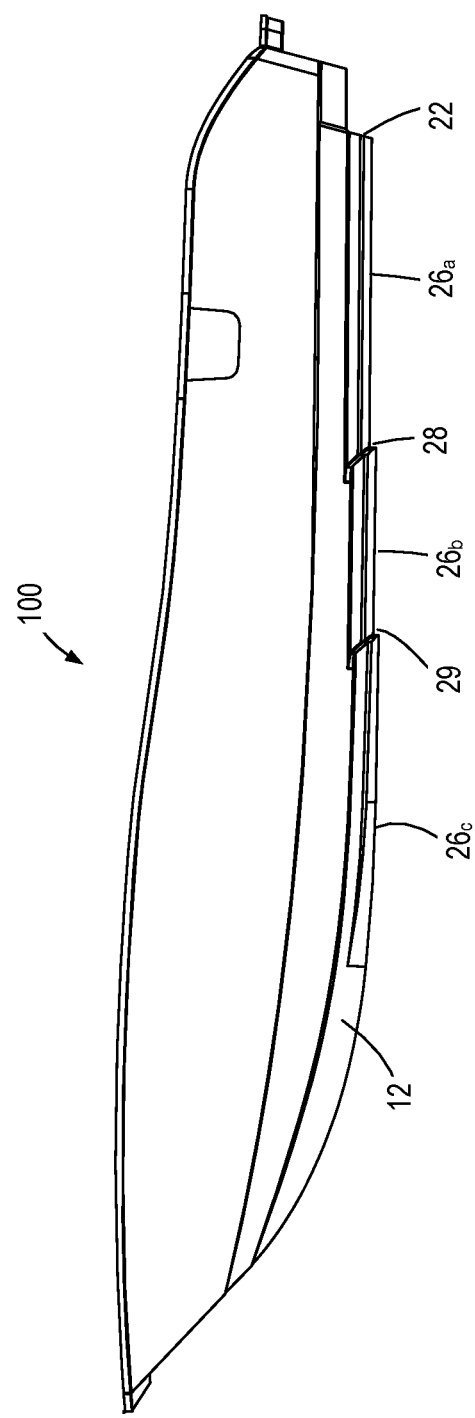
FIG. 6 is a left-side view of the exemplary catamaran boat hull shown in FIG. 1 in accordance with an embodiment of the present invention.

FIG. 4 is a perspective view of the exemplary catamaran boat hull 100 shown in FIG. 1 as viewed from the side left quadrant of the hull 100 but from a similar stern vantage point to the right of the hull 100 illustrating the hull features with emphasis on both hull and stern features in accordance with an embodiment of the present invention. Referring now to FIG. 4, each of the two longitudinal steps 28/29 are shown to be running across a width $W_S$ of the first sponson 10 or the second sponson 12. Exemplary longitudinal steps 28/29 are further illustrated in FIGS. 5-6 from the left-side and right side of hull 100 (which has an overall length of $L_H$). As shown in FIG. 6, the two longitudinal steps 28/29 divide the sponson running surface 26 of each hull sponson 10/12 into an aft sponson running surface section 26a, a mid-hull sponson running surface section 26b, and a forward hull sponson running surface section 26c. Essentially, each of longitudinal steps 28/29 is a step disposed across the respective hull sponson so that the step causes a change in the running surface 26 from one level to the next along the length of the hull sponson 10/12. For example, an embodiment has the mid-hull sponson running surface section 26b being lower (e.g., relative to the waterline of hull sponsons 10/12) than the aft sponson running surface section 26a at a first keel intersection between the aft sponson running surface section 26a and the mid-hull sponson running surface section 26b due to the first longitudinal step 28. In like manner, the forward sponson running surface section 26c in this embodiment is lower than the mid-hull sponson running surface section 26b at a second keel intersection between the forward sponson running surface section 26c and the mid-hull sponson running surface section 26b due to the second longitudinal step 29. In other words, as shown in FIGS. 5-6, those skilled in the art will appreciate that the sponson running surface 26 of each hull sponson 10/12 "steps up" towards the sponson's waterline as water runs over the sponson running surface 26 from the bow to the stern of the exemplary hull 100. In this way, those skilled in the art will further appreciate that a running surface section may be lower than or run deeper when compared to another section with reference to that sponson's waterline.

Figure 7:
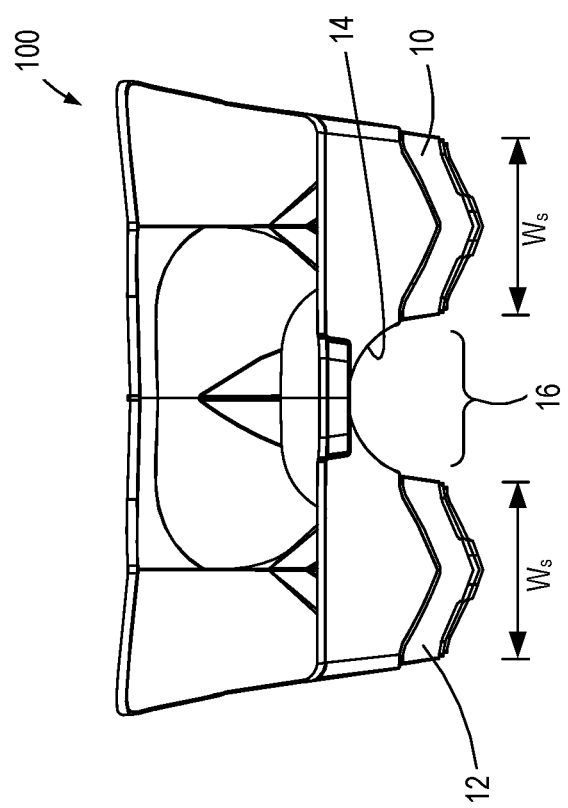
FIG. 7 is a rear/stern view of the exemplary catamaran boat hull shown in FIG. 1 in accordance with an embodiment of the present invention.
Figure 8:
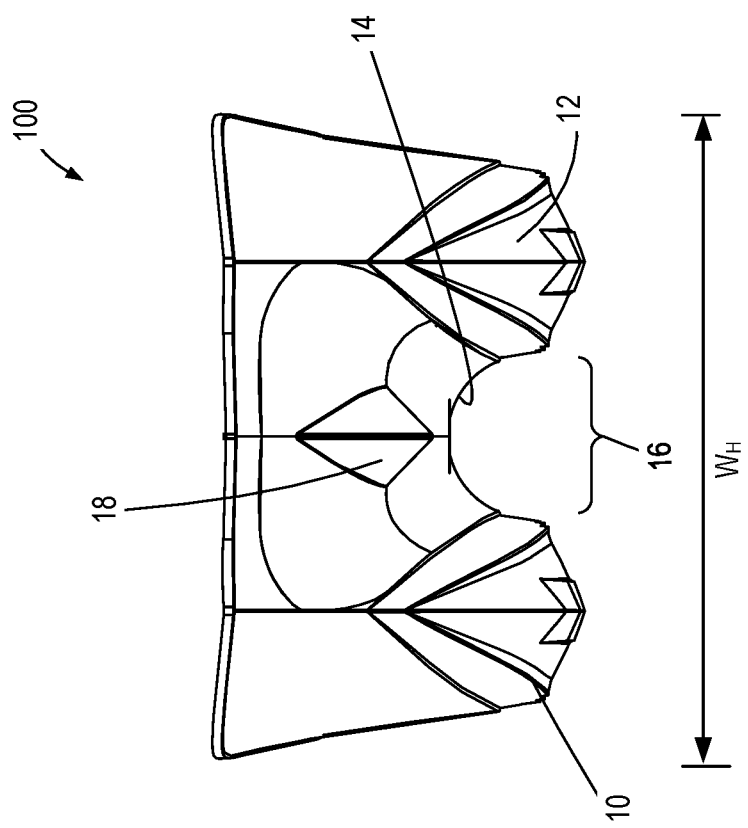
FIG. 8 is a front/bow view of the exemplary catamaran boat hull shown in FIG. 1 in accordance with an embodiment of the present invention.

FIGS. 7-8 compliment the views of FIGS. 1-6 to illustrate features of exemplary catamaran boat hull 100 from a rear/stern perspective and a front/bow perspective. Referring now to FIG. 7, the hull sponsons 10/12 and underside tunnel surface 14 are shown from a rear/stern perspective. The underside tunnel surface 14 is shown forming a channel region 16 along the catamaran boat hull centerline 11 and between the first sponson 10 and the second sponson 12 through which water runs when the catamaran boat hull 100 moves through the water. FIG. 7 also illustrates the width $W_S$ of each hull sponson 10/12, whereas the embodiment illustrated in FIG. 8 shown from a front/bow perspective illustrates width $W_H$ of exemplary catamaran boat hull 100.

Figure 9:
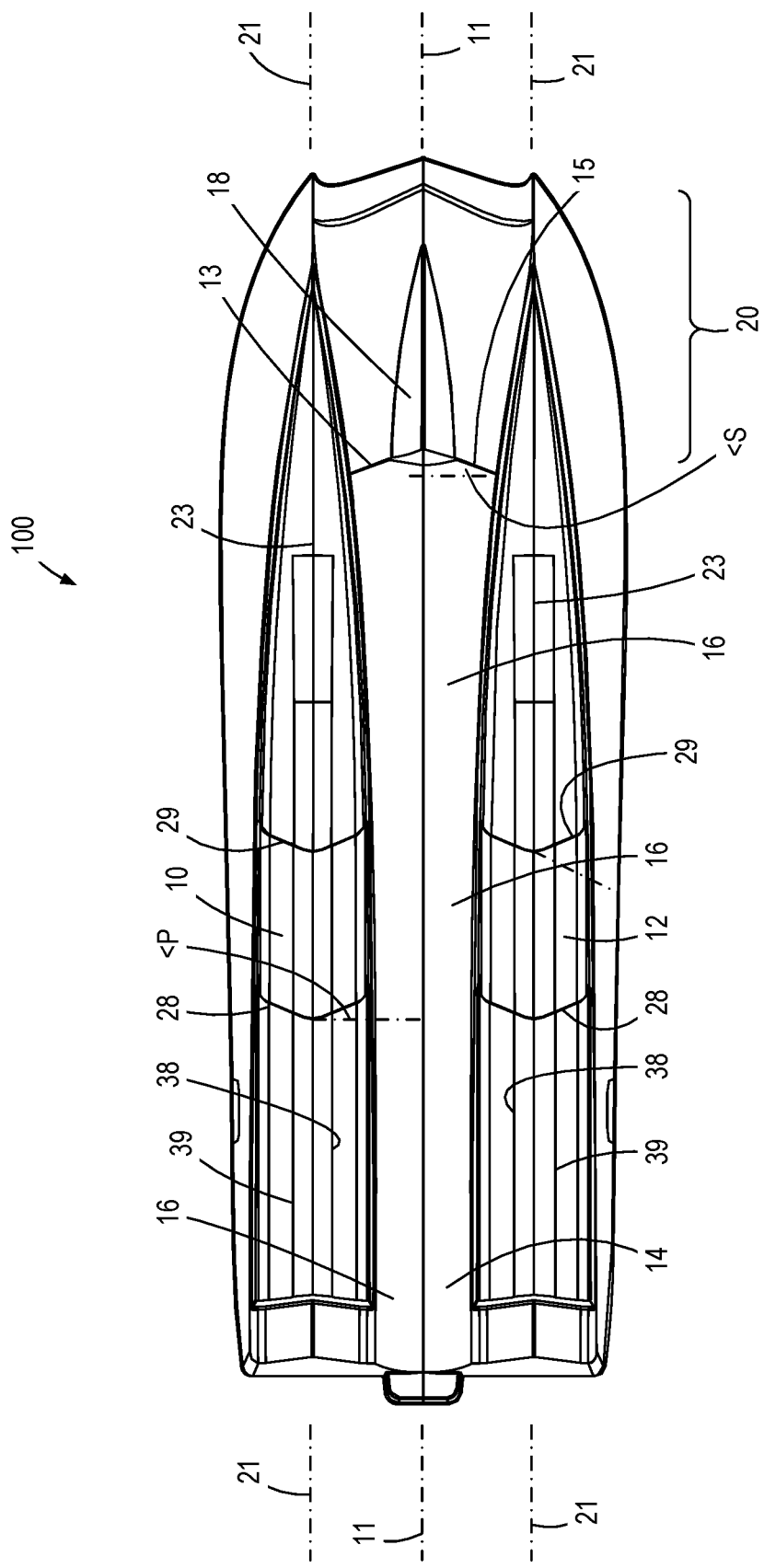
FIG. 9 is a bottom view of the exemplary catamaran boat hull shown in FIG. 1 in accordance with an embodiment of the present invention.

FIG. 9 is a bottom view of the exemplary catamaran boat hull 100 shown in FIG. 1 in accordance with an embodiment of the present invention. Referring now to FIG. 9, exemplary catamaran boat hull 100 is shown from below having exemplary underside tunnel surface 14 between sponsons 10/12 forming channel region 16 along the catamaran boat hull centerline 11 through which water runs when the catamaran boat hull 100 moves through the water. As shown in FIG. 9, each of the sponsons 10/12 includes a respective keel 23 oriented along that sponson's hull centerline 21, a sponson running surface 26 for each sponson, two longitudinal steps 28/29 on each sponson, and two transverse steps 38/39 running along each sponson. FIG. 9 further illustrates exemplary underside wave splitter 18 disposed on the forward portion 20 of the underside tunnel surface 14 along the catamaran boat hull centerline 11.

Figure 10:
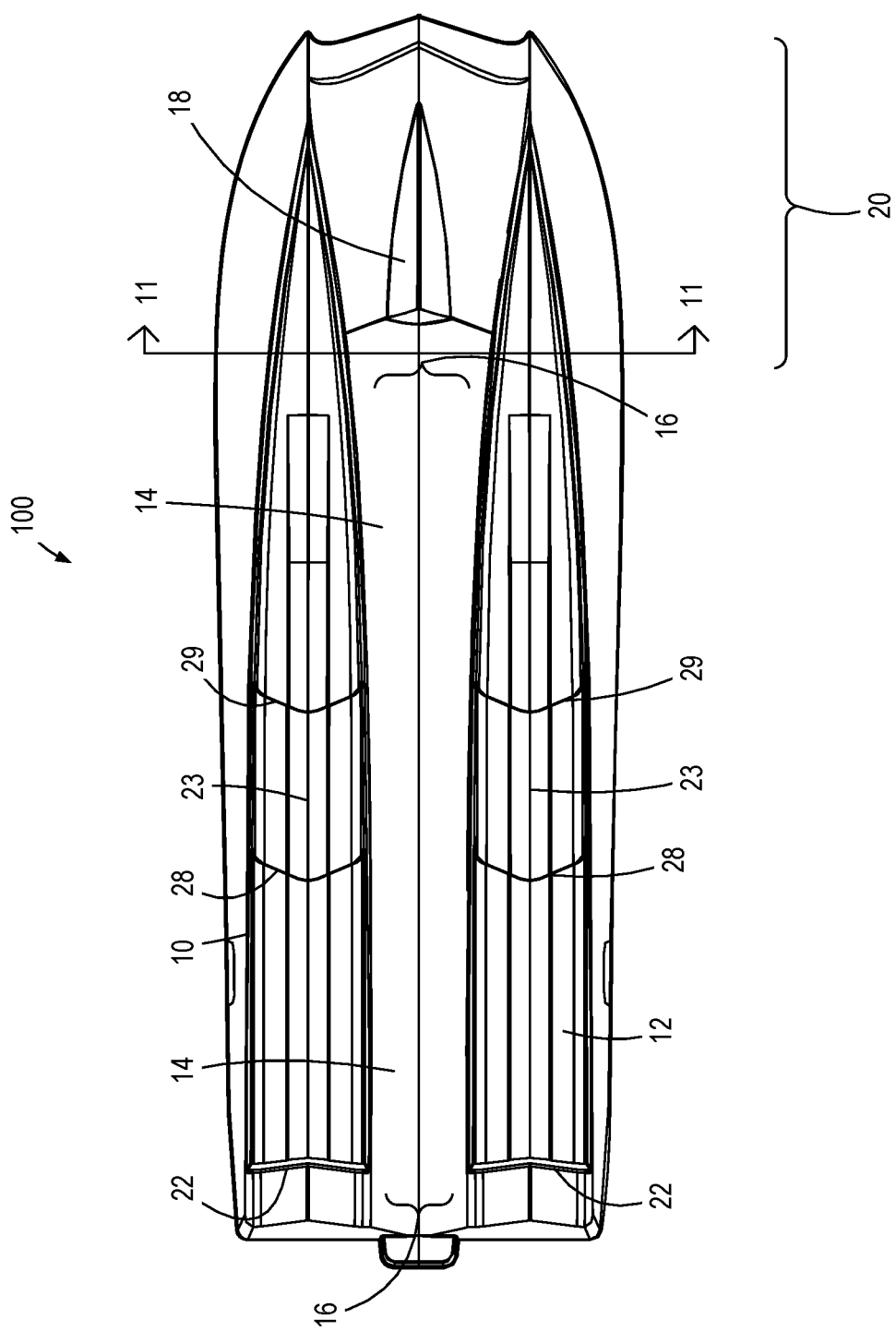
FIG. 10 is a bottom view of the exemplary catamaran boat hull shown in FIG. 1 with sectional reference in accordance with an embodiment of the present invention.

FIG. 10 is a bottom view of the exemplary catamaran boat hull 100 shown in FIG. 1 with sectional reference in accordance with an embodiment of the present invention. Referring now to FIG. 10, section reference line 11-11 is disposed near the forward portion 20 of hull 100 but not intersecting exemplary wave splitter 18.

Figure 11:
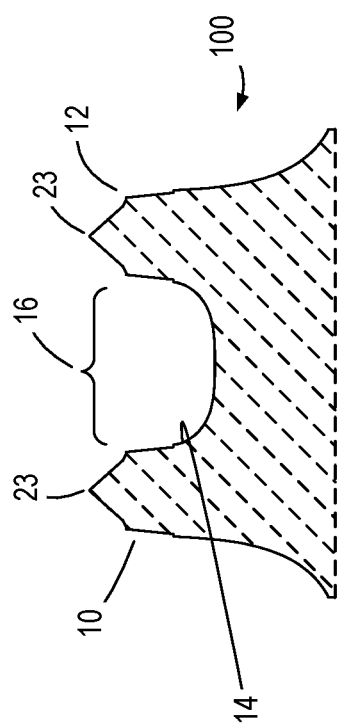
FIG. 11 is a cross-sectional view of the exemplary catamaran boat hull shown in FIG. 1 as viewed along line 11-11 shown in FIG. 10, showing bow flaring features in accordance with an embodiment of the present invention.

FIG. 11 illustrates the cross-section of exemplary catamaran boat hull 100 at line 11-11, showing bow flaring features along the outer parts of each of hull sponsons 10/12 and a further view of underside tunnel surface 14 and channel region 16 between the first sponson 10 and the second sponson 12 in accordance with an embodiment of the present invention.

Improved Tunnel Spray Management

As noted above relative to FIG. 2, embodiments of exemplary wave splitter 18 may be used in conjunction with spray rails disposed relative to wave splitter 18 as part of an exemplary hull 100 to help block or divert water trying to exit the front of the underside tunnel surface 14 and channel region 16 (generally referred to as tunnel spray). In an embodiment, a spray rail may be located near the sheer line at the bow of hull 100 to help address water trying to exit at just below the bow. Another embodiment may alternatively (or in addition) deploy one or more sets of spray rails commensurate with and/or aft of the exemplary wave splitter 18. For example, exemplary spray rails may connect to an aft end of the wave splitter 18 or be disposed proximate to wave splitter 18 (e.g., beside wave splitter 18, behind wave splitter 18) without being attached to wave splitter 18. In another example, exemplary sets of such spray rails may be deployed of different heights and profiles to essential triage tunnel spray in stages as an enhanced level of tunnel spray management. Those skilled in the art will appreciate that such spray rails relative to wave splitter 18 help to decrease the amount of water exiting the tunnel's channel region 16 by diverting at least some of such water from continuing along the underside tunnel surface 14 and, in some embodiments, by directing the spray towards wave splitter 18 (such as at the aft end of the wave splitter 18 itself (e.g., protruding aft surface 183)) or otherwise disrupting at least some of the spray from moving forward of wave splitter 18. Such improved structure leads to less water getting into the forward part of tunnel's channel region 16 as part of improved tunnel spray management and avoids potentially dangerous conditions when the hull 100 is moving through water.

Figure 12:
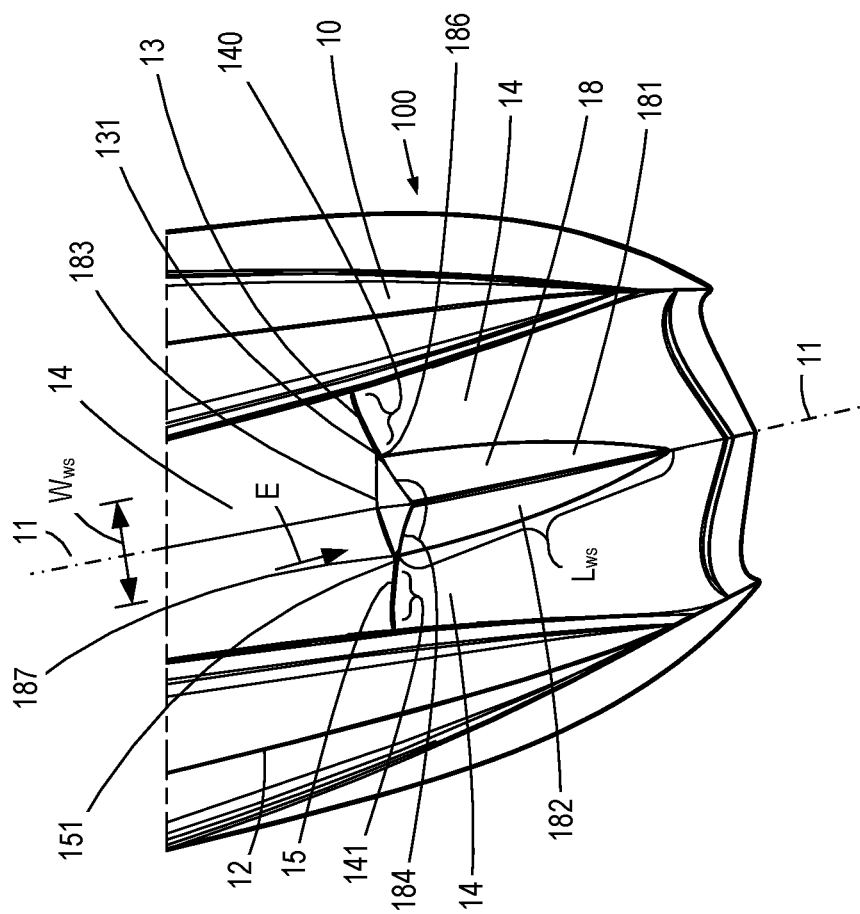
FIG. 12 is a close-up view of the front/bow portion of the exemplary catamaran boat hull shown in FIG. 9 in accordance with an embodiment of the present invention.

FIG. 12 is a close-up view of a front/bow portion area of the exemplary catamaran boat hull 100 shown in FIG. 9 in accordance with an embodiment of the present invention. Referring now to FIG. 12, exemplary underside wave splitter 18 having downward protruding side surfaces 181/182 and protruding aft surface 183 is shown disposed with spray rails 13/15 along the underside tunnel surface 14 where each of these spray rails 13/15 extends from the protruding aft surface 183 and away from the catamaran boat hull centerline 11. An embodiment of each of the downward protruding side surfaces 181/182 of the underside wave splitter 18 may be implemented where the wave splitter 18 forms a bow-oriented splitting wedge relative to the forward portion 20 of the underside tunnel surface 14. A further embodiment of each of the downward protruding side surfaces 181/182 of the underside wave splitter 18 may have the downward protruding side surfaces 181/182 intersecting the protruding aft surface 183 of the underside wave splitter 18 forming an aft-oriented spray edge 184 relative to the forward portion 20 of the underside tunnel surface 14.

While exemplary wave splitter 18 may have any desired dimensions, in some embodiments, wave splitter 18 has an overall length $L_{WS}$ ranging from about 60.0 inches to about 90.0 inches; an overall width $W_{WS}$ ranging from about 15.0 inches to about 30.0 inches; and an overall depth (or height) $D_{WS}$ ranging from about 10.0 inches to about 20.0 inches. In further embodiments, wave splitter 18 has an overall length $L_{WS}$ of about 73.1 inches; an overall width $W_{WS}$ of about 22.5 inches; and a depth $D_{WS}$ of about 12.4 inches.

In more detail and as illustrated in FIG. 12, an embodiment may have spray rail 13 protruding from the underside tunnel surface 14 between a first side 186 of the protruding aft surface 183 of the underside wave splitter 18 and the first sponson 10. In like manner, such an embodiment may have spray rail 15 protruding from the underside tunnel surface 14 between a second side 187 of the protruding aft surface 183 of the underside wave splitter 18 and the second sponson 12. As such, exemplary spray rails 13/15 collectively protrude from underside tunnel surface 14 near underside wave splitter 18 to help disrupt spray from moving forward of the underside wave splitter 18.

In still another embodiment as illustrated in FIG. 12, a first portion 140 of underside tunnel surface 14 may be defined between the first sponson 10 and the first side 186 of the protruding aft surface 183 of the underside wave splitter 18. In like manner, a second portion 141 of the underside tunnel surface 14 may be defined between the second sponson 12 and the second side 187 of the protruding aft surface 183 of the underside wave splitter 18. In this particular embodiment, the first spray rail 13 protrudes from the first portion 140 of the underside tunnel surface 14 to help disrupt spray from moving forward of the underside wave splitter 18 along the underside tunnel surface 14. In similar fashion for this embodiment, the second spray rail 15 protrudes from the second portion 141 of the underside tunnel surface 14 to help disrupt spray from moving forward of the underside wave splitter 18 along the underside tunnel surface 14.

Different embodiments of spray rails 13/15 may be configured relative to the centerline 11 to help divert or disrupt spray in different ways. For example, spray rails 13/15 may be oriented perpendicular to centerline 11 in one embodiment. In another embodiment, and as shown in FIGS. 9 and 12, spray rails 13/15 may be in a canted orientation relative to centerline 11. For example, the first spray rail 13 may be disposed in a first diversion orientation where a forward most end 131 of the first spray rail 13 is located at an intersection of the first spray rail 13 and the first side 186 of the protruding aft surface 183 of the underside wave splitter 18. In like manner, the second spray rail 15 of the set of spray rails 13/15 may be disposed in a second diversion orientation where a forward most end 151 of the second spray rail 15 is at an intersection of the second spray rail 15 and the second side 187 of the protruding aft surface 183 of the underside wave splitter 18. Such a first diversion orientation of the first spray rail 13 and a second diversion orientation of the second spray rail 15 provides a type of symmetric canted spray rail configuration relative to the underside wave splitter 18. Such diversion orientations help to disrupt spray from moving forward of the underside wave splitter 18 and at least partially towards the protruding aft surface 183 of the underside wave splitter 18 as water moves from behind the underside wave splitter 18 through the tunnel's channel region 16. In a further embodiment, multiple sets of spray rails may be deployed where a first set of spray rails has a characteristic diversion orientation and where the second set has a different diversion orientation (e.g., having different angles of orientation relative to wave splitter 18 and/or centerline 11).

In one embodiment shown in FIG. 9, each of first and second spray rails 13/15 forms an angle ∠S with a line normal to centerline 11. In some embodiments, angle ∠S ranges from about 15° to about 45°, and more typically, ranges from about 20° to about 25°. In some embodiments, angle ∠S is about 21.2°.

Figure 13:
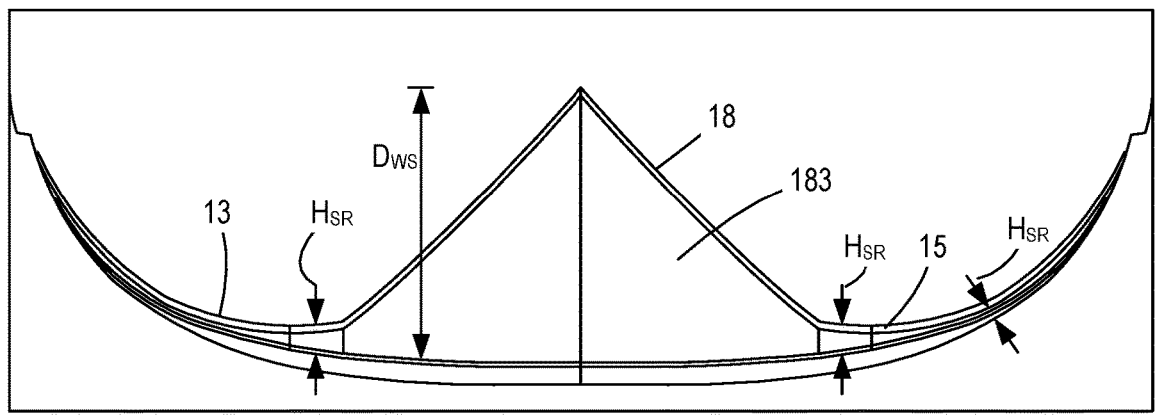
FIG. 13 is a view of first and second spray rails on opposite sides of an aft surface of an underside wave splitter positioned along a bottom surface of the exemplary catamaran boat hull shown in FIG. 12 as viewed along direction E shown in FIG. 12 in accordance with an embodiment of the present invention.

FIG. 13 is a rear view of exemplary first and second spray rails 13/15 on opposite sides of an aft surface 183 of exemplary underside wave splitter 18 positioned within channel region 16 along underside tunnel surface 14 of the exemplary catamaran boat hull 100 shown in FIG. 12 and as viewed along direction E shown in FIG. 12 in accordance with an embodiment of the present invention. Referring now to FIG. 13, first spray rail 13 and second spray rail 15 are illustrated and shown on either side of underside wave splitter 18. Each of first spray rail 13 and second spray rail 15 independently has a spray rail height $H_{SR}$ of up to about 3.0 inches.

In a further embodiment, spray rail height $H_{SR}$ shown in FIG. 13 may vary relative to a distance off centerline 11 of the catamaran boat hull 100. For example, an embodiment may have spray rail height $H_{SR}$ increasing from a smaller spray rail height $H_{SR}$ closer to or adjacent sponsons 10/12 to a greater spray rail height $H_{SR}$ closer to or adjacent the underside wave splitter 18. In another embodiment, spray rail height $H_{SR}$ may increase from a smaller spray rail height $H_{SR}$ closer to or adjacent the underside wave splitter 18 to a greater spray rail height $H_{SR}$ closer to or adjacent the sponsons 10/12. In still another embodiment, spray rail height $H_{SR}$ may have a variable height profile where the spray rail height $H_{SR}$ changes more than just either increasing or decreasing. This may depend on the configuration and dimensions of the underside wave splitter 18 (e.g., overall length $L_{WS}$ of wave splitter 18; overall width $W_{WS}$ of splitter 18; maximum depth $D_{WS}$ of splitter 18; varying deadrise of splitter 18). Those skilled in the art will appreciate that the maximum depth $D_{WS}$ of the underside wave splitter 18 is represented by a maximum distance between (i) a plane containing a portion of the underside tunnel surface 14 surrounding the underside wave splitter 18 and (ii) a point along an outer surface of the underside wave splitter 18.

Figure 14:
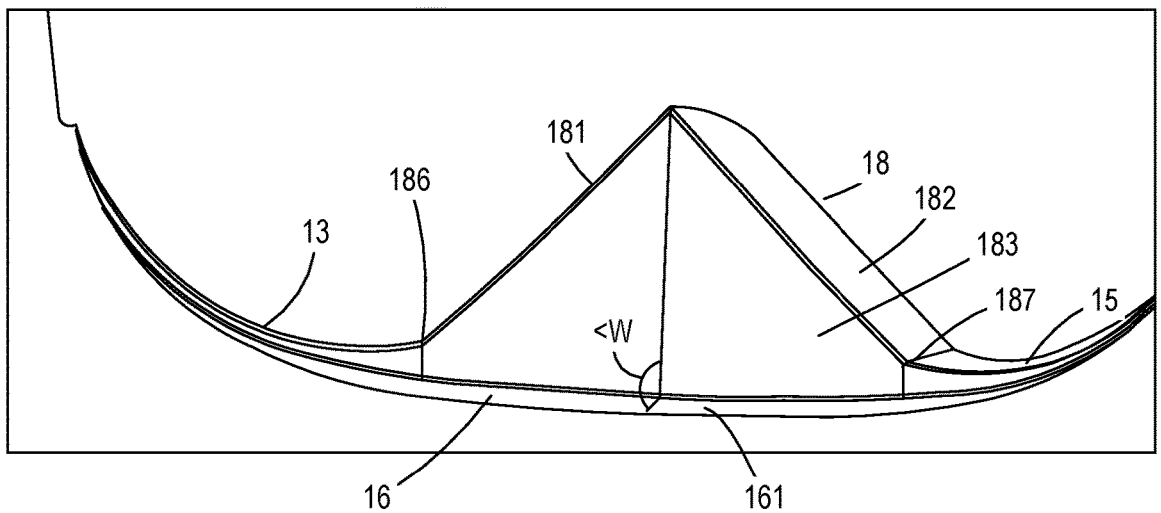
FIG. 14 is a rear perspective view of the first and second spray rails on opposite sides of the aft surface of the underside wave splitter shown in FIG. 13 in accordance with an embodiment of the present invention.

As shown in FIG. 13 and FIG. 14, in one embodiment, spray rail height $H_{SR}$ increasing from a smaller spray rail height $H_{SR}$ adjacent sponsons 10/12 to a greater spray rail height $H_{SR}$ adjacent the underside wave splitter 18. For example, in some embodiments, the spray rail height $H_{SR}$ may be less than 0.5 inches (e.g., 0.46 inches) adjacent sponsons 10/12, and gradually increase up to about 2.0 inches (e.g., 1.67 inches) adjacent opposite sides of the underside wave splitter 18.

An embodiment of exemplary underside wave splitter 18 used with spray rails 13/15 may have a maximum depth $D_{WS}$ proximate an intersection of the downward protruding side surfaces 181/182 and the protruding aft surface 183; may have a cross-sectional V-shape within a plane perpendicular to the catamaran boat hull centerline 11; and/or may be implemented with each of its downward protruding side surfaces 181/182 and the protruding aft surface 183 being triangular in shape with three surface edges. In addition, protruding aft surface 183 may form an angle ∠W (see, FIG. 14 illustrating a perspective view of the embodiment of FIG. 13) with channel surface 161 adjacent to protruding aft surface 183, wherein angle ∠W ranges from about 60° to about 120°. In some embodiments, angle ∠W ranges from about 85° to about 100°. In some embodiments, angle ∠W is about 95°.

Improved Running Characteristics—Use of Modified Lifting Pad & Transverse Steps

Embodiments of exemplary catamaran boat hull 100 may implement further improvements to help improve various running characteristics using a variety of different structural innovations to hull 100. In general, an example of such further improvement involves modification of part of the underside running surface 26 of each hull sponson 10/12—more specifically, use of a varying deadrise lifting pad placed relative to the keel 23 of each sponson 10/12. This may be implemented as part of exemplary catamaran boat hull 100 to help provide lift, and also involve a transverse step 38/39 in the bottom of the hull sponson 10/12 that further helps to reduce resistance on the underwater running surface for that hull sponson 10/12. Such an improvement helps a boat that utilizes such an exemplary catamaran boat hull 100 track straighter in operation. Such an improvement also may help to compliment the longitudinal steps 28/29 on each hull sponson 10/12 by introducing air without the need for the large air channels (i.e., where at least some air is introduced from the front of the hull 100, and channels it aft to the transverse steps 38/39).

Figure 15:
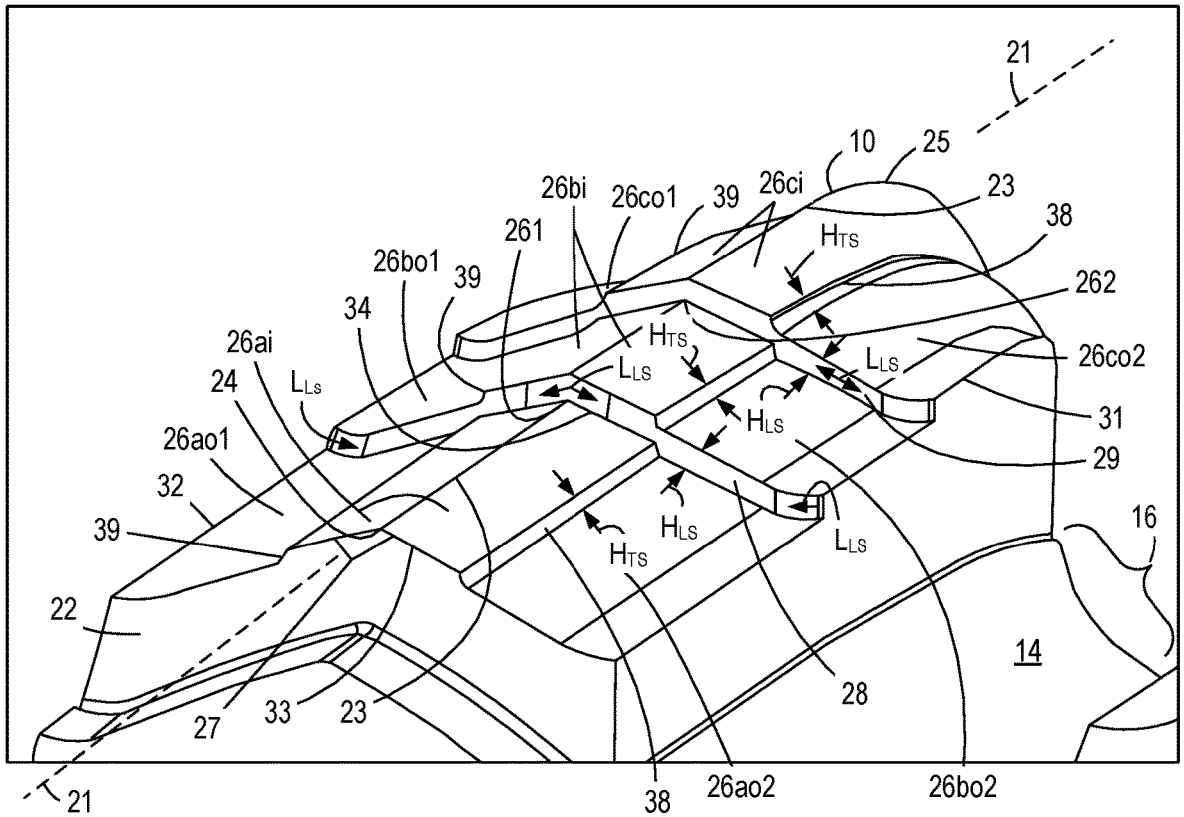
FIG. 15 is a close-up view of an exemplary running surface structure suitable for use on the exemplary catamaran boat hull shown in FIG. 9 in accordance with an embodiment of the present invention.

FIG. 15 is a close-up view of an exemplary running surface structure suitable for use on the exemplary catamaran boat hull 100 shown in FIG. 9 in accordance with an embodiment of the present invention. In particular, FIG. 15 illustrates an embodiment of exemplary catamaran boat hull 100 with focus on exemplary running surface structural elements shown relative to a hull sponson 10. Those skilled in the art will appreciate that similar exemplary running surface structural elements shown in FIG. 15 are also disposed on the other hull sponson 12.

Referring now to FIG. 15, a close-up view of exemplary hull sponson 10 is shown having sponson running surface 26 disposed on each side of keel 23 of sponson 10 extending from a running surface intersection 27 with the aft transom section 22 to the upward curving bow 25. Two longitudinal steps 28/29 are disposed at respectively different points along the keel 23 and the sponson running surface 26, each of the two longitudinal steps 28/29 running across width $W_S$ of representative sponson 10. Sponson 10 is also shown with transverse steps 38/39 disposed lengthwise along sponson 10 on opposing sides of the keel 23. The first transverse step 38 is disposed between the keel 23 and an inner chine 31 of the illustrated sponson (i.e., sponson 10), while the second transverse step 39 is disposed between the keel 23 and an outer chine 32 of the illustrated sponson.

Notably, those skilled in the art will appreciate with reference to FIG. 15 that the two transverse steps 38/39 further divide the aft sponson running surface section 26a into an exemplary inner lifting pad running portion 26ai (which spans either side of keel 23) and two outer running surface portions 26ao1/26ao2. In other words, and as shown in FIG. 15, inner lifting pad running portion 26ai is disposed between each of the outer running surface portions 26ao1/26ao2 of the aft sponson running surface section 26a as separated by each of the two transverse steps 38/39. More specifically, an embodiment of exemplary inner lifting pad running portion 26ai has a variable deadrise profile with a lower deadrise at an aft end 33 of the inner lifting pad running portion 26ai that transitions to a higher (or sharper) deadrise at a forward end 34 of the inner lifting pad running portion 26ai. For example, an embodiment of exemplary inner lifting pad running portion 26ai has a variable deadrise profile with a lower deadrise (e.g., about 16-18 degrees, nominally 17 degrees) at an aft end 33 of the inner lifting pad running portion 26ai that transitions to a higher (or sharper) deadrise (e.g., about 18-22 degrees, nominally 20 degrees) at a forward end 34 of the inner lifting pad running portion 26ai. In such an example and in comparison, the outer running surface portions 26ao1/26ao2 next to inner lifting pad running portion 26ai may have a deadrise range from 22 to 24 degrees.

Such an exemplary inner lifting pad running portion 26ai provides a combination of lift and a reduction of resistance on running surface 26 (or at least the aft sponson running surface section 26a) during operation of the catamaran boat hull 100 through water. In more detail, an embodiment of the two longitudinal steps 28/29 helps to introduce air to at least a portion of the sponson running surface 26 during operation of the catamaran boat hull 100 through water and an embodiment of transverse steps 38/39 provides a lengthwise guide for at least a portion of such air introduced as the portion of such air moves over at least the aft sponson running surface section 26a, including exemplary inner lifting pad running portion 26ai. For example, those skilled in the art will further appreciate with reference to FIG. 15 that an embodiment of transverse steps 38/39 further divide the mid-hull sponson running surface section 26b into an inner mid-hull running portion 26bi (which spans either side of keel 23) and two outer mid-hull running surface portions 26bo1/26bo2. In more detail and as shown in FIG. 15, longitudinal step 28 introduces air to at least the aft sponson running surface section 26a during operation of the catamaran boat hull 100 through water, while longitudinal step 29 introduces air to at least the mid-hull sponson running surface section 26b during operation of the catamaran boat hull 100 through water. Accordingly, and in such an embodiment, the transverse steps 38/39 each provide a lengthwise guide for at least a portion of the air introduced to the mid-hull sponson running surface section 26b and the aft sponson running surface section 26a, including exemplary inner lifting pad running portion 26ai.

Those skilled in the art will also appreciate with reference to FIG. 15 that an embodiment of transverse steps 38/39 further divide at least a widthwise portion of the forward hull sponson running surface section 26c. Those skilled in the art will appreciate that embodiments of such a widthwise portion of the forward hull sponson running surface section 26c need not encompass the entire forward hull sponson running surface section 26c. In more detail, each of exemplary transverse steps 38/39 further divide the forward hull sponson running surface section 26c into an inner forward hull sponson running surface section 26ci (which spans wither side of keel 23) and two outer forward hull sponson running surface portions 26co1/26co2. Accordingly, such an embodiment has transverse steps 38/39 introducing additional air from forward of the second longitudinal step 29 to at least the mid-hull sponson running surface section 26b resulting in a further reduction of friction on the sponson running surface 26 during operation of the catamaran boat hull 100 through water.

Embodiments may implement longitudinal steps 28/29 and transverse steps 38/39 with particular dimensions to assist in such improved running characteristics. For example, an embodiment of exemplary longitudinal steps 28/29 may be implemented as having a longitudinal step height $H_{LS}$ (as shown in FIG. 15) of at least 1.5 inches. In another embodiment, exemplary longitudinal steps 28/29 may be implemented as having a varying longitudinal step height $H_{LS}$ that varies from about 1.5 inches to about 2.5 inches along a width of each of the two longitudinal steps 28/29. For example, in some embodiments, exemplary longitudinal steps 28/29 each has a varying longitudinal step height $H_{LS}$ that varies from about 1.7 inches along an outer edge (i.e., adjacent inner chine 31, and outer chine 32 on hull sponsons 10/12) to about 2.1 inches at keel 23.

In still another embodiment, longitudinal steps 28/29 may be implemented as having a curved step profile such that an inner longitudinal step portion (i.e., at keel 23) is closer to the aft transom section 22 than outer longitudinal step portions (i.e., adjacent inner chine 31, and outer chine 32 on hull sponsons 10/12) along opposite sides of the inner longitudinal step portion. In other words, the outer portion of longitudinal steps 28/29 on a particular sponson may curve forward (i.e., towards the bow as opposed to being curved towards aft transom section 22). As shown in FIG. 9, each of longitudinal steps 28/29 may form an angle ∠P with a line normal to centerline 11, wherein angle ∠P ranges from about 15° to about 30°. In some embodiments, angle LP is about 22.9°.

While the position of each of longitudinal steps 28/29 along sponsons 10/12 may vary, in some embodiments, longitudinal step 28 is positioned from about 90 inches to about 120 inches from the aft transom section 22, and longitudinal step 29 is positioned from about 150 inches to about 180 inches from the aft transom section 22. In some embodiments, longitudinal step 28 is positioned about 106.8 inches from the aft transom section 22, and longitudinal step 29 is positioned about 163.9 inches from the aft transom section 22.

Similarly relative to the transverse steps, an embodiment of exemplary transverse steps 38/39 may be implemented as having a transverse step height $H_{TS}$ of at least 1.0 inches. In another embodiment, transverse steps 38/39 may be implemented as having a transverse step height $H_{TS}$ that varies from about 1.0 inches to about 2.5 inches (or from 1.0 inches to about 1.5 inches) along a length of each of the two transverse steps 38/39. In still another embodiment, a transverse step height $H_{TS}$ of each of transverse steps 38/39 may decrease from upward curving bow 25 to the aft transom section 22. For example, the transverse step height $H_{TS}$ adjacent the forward hull sponson running surface section 26c may be about 1.12 inches, the transverse step height $H_{TS}$ adjacent the mid-hull sponson running surface section 26b may be about 1.10 inches, and the transverse step height $H_{TS}$ adjacent the aft sponson running surface section 26a may be about 1.08 inches. In still another embodiment, transverse steps 38/39 may be implemented to each extend in substantially straight lines lengthwise along opposing sides of the keel 23 (e.g., when viewed from a bottom of the catamaran boat hull 100).

In addition, running surface 26 of each hull sponson 10/12 may be designed to have a running surface width $W_{RS}$ extending between transverse steps 38/39, wherein running surface width $W_{RS}$ ranges from about 12.0 inches to about 18.0 inches. In some embodiments, running surface width $W_{RS}$ is about 14.7 inches.

Figure 16:
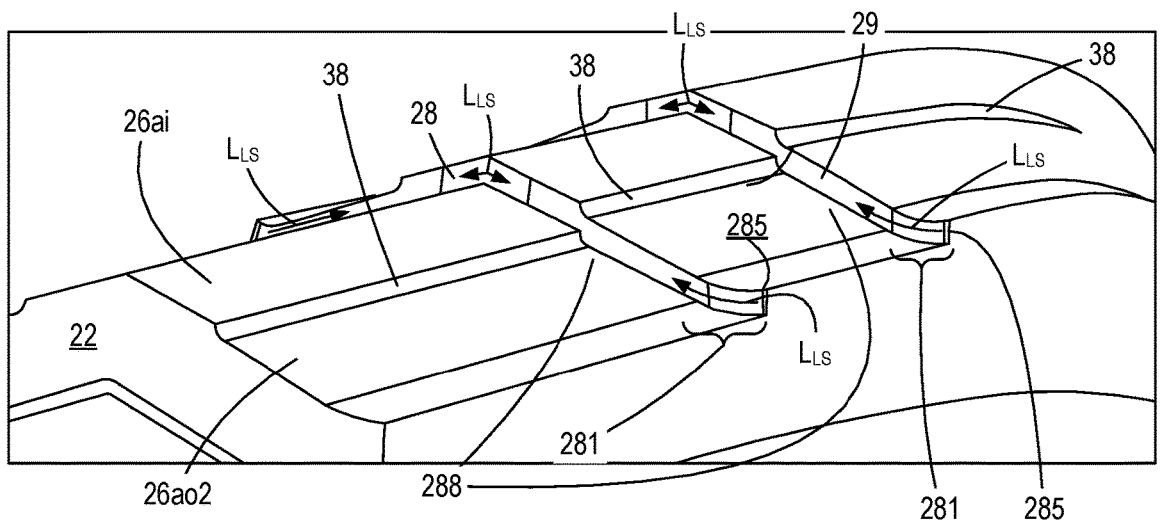
FIG. 16 depicts exemplary step surface profiles suitable for use along one or more longitudinal steps, transverse steps, or both in the exemplary catamaran boat hull shown in FIG. 9 in accordance with an embodiment of the present invention.

Improved Running Characteristics—Improved Step Shape for Longitudinal and Transverse Steps Still further embodiments that help to improve running characteristics involve an improved step shape for each of longitudinal steps 28/29 and/or transverse steps 38/39. This may be implemented as part of exemplary catamaran boat hull 100 to help improve the planing ability of hull 100 and still lead to drag reduction or a reduction in hull resistance when hull 100 is on plane. This type of improved step shape allows for less water to be trapped in a "channel" 288 extending along a length $L_{LS}$ of each of the longitudinal steps 28/29 as shown in FIG. 16 (when compared to hulls that have longitudinal steps without features of such an improved step shape). For example, in embodiments described herein using exemplary improved step shapes for each of longitudinal steps 28/29, the volume of water trapped aft of longitudinal steps 28/29 has been determined to be significantly (e.g., one quarter to two-third) less than that found with conventional stepped hulls.

Referring further to FIG. 16, in some embodiments, improvements to boat performance may be obtained by further designing each of longitudinal steps 28/29 to have a step profile (e.g., a step edge profile) along opposite outer edges (e.g., adjacent inner chine 31 and outer chine 32 on hull sponsons 10/12) that include at least one of: (1) a curved longitudinal step portion 281 with an outer edge portion of the curved longitudinal step portion 281 being further away from aft transom section 22, and (2) an edge offset 285 where longitudinal step 28 or 29 meets the hull side (e.g., the outer side of the respective hull sponson 10/12). Each of (1) curved longitudinal step portion 281, and (2) edge offset 285 (generally referred to as an inward oriented step edge offset providing an indentation relative to the side of the particular hull sponson), when present, is believed to increase air flow into channel 288. In some embodiments, each of longitudinal steps 28/29 comprise (1) curved longitudinal step portion 281, and (2) edge offset 285 along opposite ends of longitudinal steps 28/29. In further embodiments, edge offset 285 may be implemented as an inward step edge offset where the edge of longitudinal step 28/29 meets the hull side of the particular sponson so as to break surface tension and allow air to travel to the channel 288. In more specific embodiments, the inset distance D285 (shown in FIG. 18) from the hull side for such an exemplary edge offset 285 may nominally be ¾" to ½".

Referring back to FIG. 16, in some embodiments, improvements to boat performance may be obtained by designing each of transverse steps 38/39 to have a smooth, curved (e.g., concave) step profile as transverse step 38 or 39 goes from (1) the aft sponson running surface section 26a to one of the two outer running surface portions 26ao1/26ao2, (2) the mid-hull sponson running surface section 26b to one of the two outer mid-hull running surface portions 26bo1/26bo2, and (3) the forward hull sponson running surface section 26c to one of the two outer forward hull sponson running surface portions 26co1/26co2. Such a transverse step 38/39 design has been shown to provide a less jarring or harsh landing during operation. Such a curved step profile for transverse steps 38/39, as a type of step shape enhancement, may be implemented with radiused surfaces as explained in more detail below with respect to FIG. 18.

Improved Running Characteristics—Use of Radiused Chines on Hull Sponsons

Still another such further embodiment that helps improve running characteristics involves the shape of running surface chines on the hull sponsons 10/12. In general, this aspect focuses on the intersection of a bottom surface of a hull sponson (e.g., the sponson running surface 26 of hull sponsons 10/12) to the chine on the respective hull sponson. Conventional hull sponsons on known catamaran power boats are believed to typically use a narrow chine that allows for penetration of the hull sponson into the water during operation. A general embodiment for this aspect may deploy a smooth, radiused transition from a hull surface to the chine (e.g., inner chine 31, outer chine 32 on hull sponsons 10/12), which provides more lift from a narrower chine, leading to a smoother landing without sacrificing hull lift. This also leads to less harsh landings in rough seas due to the transition, which causes the water existing the chine to have a much smoother transition and help avoid abrupt impacts on the hull upon re-entry into the water. The radiused transition (e.g., arc curve) provides more hydrodynamic lift due to a larger surface area when compared to a traditional hull where the running surface to chine interactions is typically sharp.

Figure 17:
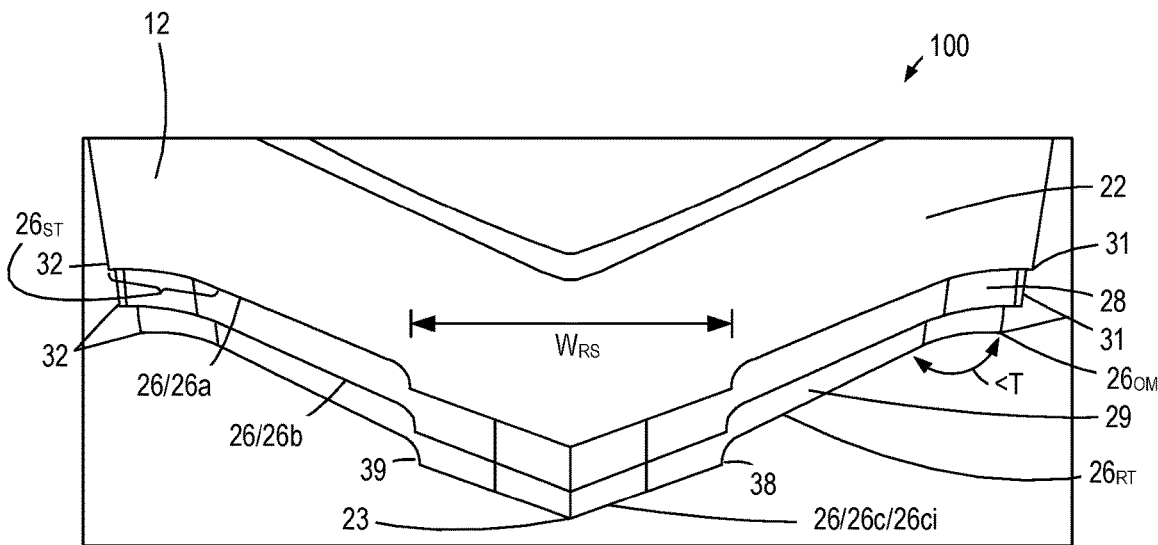
FIG. 17 is a close-up view of a bottom surface profile of an exemplary hull sponson of the exemplary catamaran boat hull shown in FIG. 1 showing features along the bottom surface of the exemplary hull sponson in accordance with an embodiment of the present invention.

FIG. 17 is a close-up view of a bottom surface profile of an exemplary hull sponson 12 of the exemplary catamaran boat hull 100 shown in FIG. 1 showing features along the bottom surface of the exemplary hull sponson 12 in accordance with an embodiment of the present invention. In particular, FIG. 17 illustrates an embodiment of exemplary catamaran boat hull 100 with focus on hull bottom surfaces and chines show relative to hull sponson 12. Those skilled in the art will appreciate that similar exemplary running surface structural elements shown in FIG. 17 are also disposed on the other hull sponson 10.

Referring now to FIG. 17, a close-up view of exemplary hull sponson 12 is shown where an embodiment of exemplary underside sponson running surface 26 has an angled sponson running surface $26_{RT}$ extending along an outer portion of the sponson running surface 26 between (i) the keel 23 and (i) either an inner chine 31 or an outer chine 32. The underside sponson running surface 26 in this embodiment also has an outermost sponson running surface edge $26_{OM}$ adjacent either the inner chine 31 or the outer chine 32. Furthermore, the underside sponson running surface 26 in this embodiment is also configured to have a transition angle $\angle T$ between the angled sponson running surface $26_{RT}$ and the outermost sponson running surface edge $26_{OM}$, where a transition surface $26_{ST}$ between the angled sponson running surface $26_{RT}$ and the outermost sponson running surface edge $26_{OM}$ is represented by a smooth, arc-shaped curve.

In some embodiments, the outermost sponson running surface edge $26_{OM}$ may be oriented horizontally. The transition angle $\angle T$ in various embodiments may, for example, be greater than 90° up to about 165°; from about 120° up to about 160°; or from about 150° to about 157°. Additionally, the smooth, arc-shaped curve in further embodiments may have a curve length $L_C$ of from about 1.0 in to about 6.0 inches, but preferably from about 2.0 to about 4.0 inches.

In more detail, a further embodiment that deploys modified chine shaping may implement each of (1) the aft sponson running surface section 26*a*, (2) the mid-hull sponson running surface section 26*b*, and (3) the forward hull sponson running surface section 26*c* as independently having an angled sponson running surface 26$_{RT}$, an outermost sponson running surface edge 26$_{OM}$, and a transition angle ∠T between the angled sponson running surface 26$_{RT}$ and the outermost sponson running surface edge 26$_{OM}$. In such an embodiment, the angled sponson running surface 26$_{RT}$ extends along an outer portion of the aft sponson running surface section 26*a*, the mid-hull sponson running surface section 26*b*, and the forward hull sponson running surface section 26*c*. Additionally, in such an embodiment, the outermost sponson running surface edge 26$_{OM}$ is adjacent either of the inner chine 31 or the outer chine 32 along each of the aft sponson running surface section 26*a*, the mid-hull sponson running surface section 26*b*, and the forward hull sponson running surface section 26*c*. Further, in such an embodiment, a transition surface 26$_{ST}$ between the angled sponson running surface 26$_{RT}$ and the outermost sponson running surface edge 26$_{OM}$ is represented by a smooth, arc-shaped curve for each of the aft sponson running surface section 26*a*, the mid-hull sponson running surface section 26*b*, and the forward hull sponson running surface section 26*c*.

Figure 18:
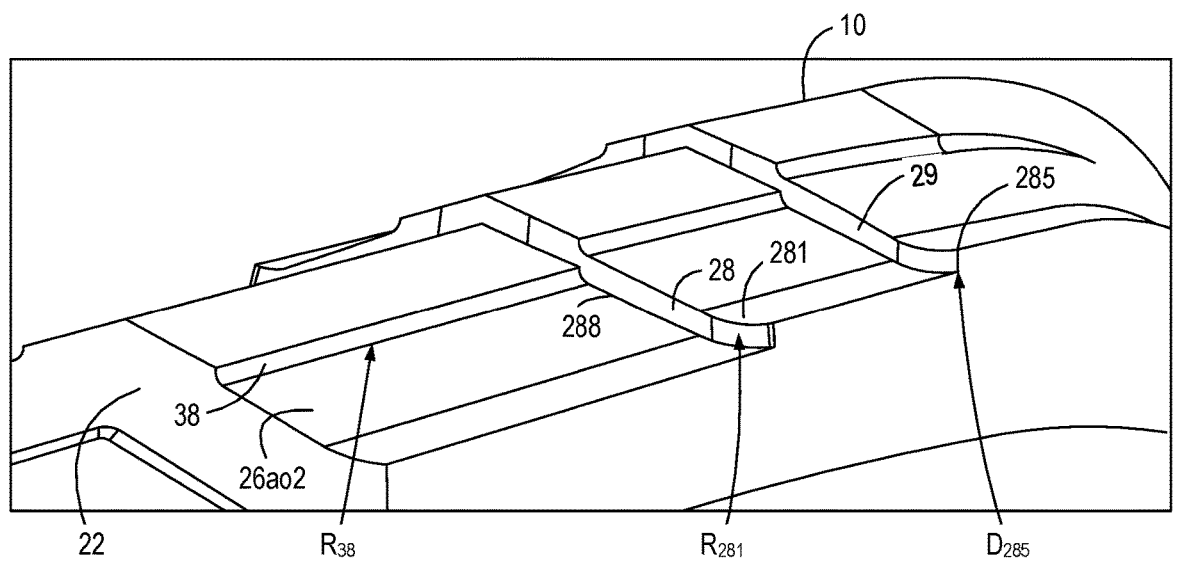
FIG. 18 is a close-up view similar to FIG. 15 illustrating various exemplary radiused surfaces and structure in accordance with an embodiment of the present invention.

Additional embodiments that also help improve running characteristics may involve the shape of radiused surfaces relative to the transverse steps 38/39 and portions of longitudinal steps 28/29 on the hull sponsons 10/12. FIG. 18 is a close-up view similar to FIG. 15 illustrating various exemplary radiused surfaces and offset structure in accordance with an embodiment of the present invention. Referring now to FIG. 18, exemplary hull sponson 10 is shown employing an exemplary radiused surface R38 at the inner edge of transverse step 38 as it intersects one of the outer running surface portions 26*ao*2. Those skilled in the art will appreciate that exemplary radiused surface R38 may be used on other portions of transverse steps 38/39 along the length of the particular sponson (as explained above relative to FIG. 16) to help soften the ride and reduce undesired impacts from re-entry/landings during operation of the catamaran boat hull 100.

FIG. 18 further illustrates exemplary curved longitudinal step portion 281 with an outer edge portion of the curved longitudinal step portion 281 being oriented towards the bow and further away from aft transom section 22. An embodiment may employ an exemplary radiused curve 8281 as part of the curved longitudinal step portion 281 on each of the opposing outer edges to help funnel air into the channel 288 extending along a length L$_{LS}$ of each of the longitudinal steps 28/29.

Combination of Catamaran Boat Hull Features

Those skilled in the art will appreciate that embodiments of an exemplary catamaran boat hull 100 may deploy one or more of the above-described improvements as a combination of features that collectively and in combination improves spray management and running characteristic performance for such a hull 100. Such an embodiment employing multiple improvement features may, for example, have underside tunnel surface 14 forming the channel region 16 between the first sponson 10 and the second sponson 12 is represented by at least one smooth, arc-shaped curve (for example, such as that shown in FIGS. 8 and 11), by at least a single smooth, arc-shaped curve (for example, such as that shown in FIG. 8; by two smooth, arc-shaped curves (for example, such as that shown in FIG. 11). Such smooth, arc-shaped curves may, for example, span an arc length of about 180°.

Embodiments of exemplary catamaran boat hull 100 may, for example, have an overall length L$_H$ of from about 12.0 feet (ft) to about 60.0 ft; from about 24.0 feet (ft) to about 40.0 ft; or preferably about 34 ft. Embodiments of exemplary catamaran boat hull 100 may, for example, have an overall width W$_H$ of from about 4.0 feet (ft) to about 20.0 ft; from about 6.0 feet (ft) to about 12.0 ft; or preferably about 8 ft.

Methods of Making Catamaran Boat Hulls

Embodiments may also include a method of making exemplary catamaran boat hull 100 as characterized by any one of embodiments discussed above. Broadly described, such a method involves forming such an improved performance catamaran boat hull 100 in a mold.

Methods of Using Catamaran Boat Hulls

Embodiments may also include a method of using an exemplary catamaran boat hull 100 as characterized by any one of embodiments discussed above. Broadly described, such a method of use involves positioning the exemplary catamaran boat hull 100 in a body of water where movement of the hull 100 through the water results in one of more of the advantages described herein.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

It should be understood that although the above-described catamaran boat hulls, and/or methods are described as "comprising" one or more components or steps, the above-described catamaran boat hulls, and/or methods may "comprise," "consists of," or "consist essentially of" any of the above-described components, features, or steps of the catamaran boat hulls, and/or methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains," "containing," "characterized by" or any other variation thereof, are intended to encompass a non-exclusive inclusion, subject to any limitation explicitly indicated otherwise, of the recited components. For example, a catamaran boat hull, and/or method that "comprises" a list of elements (e.g., components, features, or steps) is not necessarily limited to only those elements (or components or steps), but may include other elements (or components or steps) not expressly listed or inherent to the catamaran boat hull, and/or method.

As used herein, the transitional phrases "consists of" and "consisting of" exclude any element, step, or component not specified. For example, "consists of" or "consisting of" used in a claim would limit the claim to the components, materials, or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a catamaran boat hull, and/or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of."

Further, it should be understood that the herein-described catamaran boat hulls, and/or methods may comprise, consist essentially of, or consist of any of the herein-described components and features, as shown in the figures with or without any feature(s) not shown in the figures. In other words, in some embodiments, the catamaran boat hulls, and/or methods of the present invention do not have any additional features other than those shown in the figures, and such additional features, not shown in the figures, are specifically excluded from the catamaran boat hulls, suitcases, and/or methods. In other embodiments, the catamaran boat hulls, and/or methods of the present invention do have one or more additional features that are not shown in the figures.

FURTHER PARTICULAR EMBODIMENTS

In the context of the above description, what follows below is a listing of exemplary additional particular embodiments focusing on one or more aspects of the different embodiments described above:

Further Embodiment A—Improved Tunnel Spray Management

A1. A catamaran boat hull with improved tunnel spray management, the catamaran boat hull comprising:

a pair of hull sponsons comprising a first sponson and a second sponson, the first sponson and the second sponson being disposed in parallel relative to a catamaran boat hull centerline;

an underside tunnel surface that couples the first sponson to the second sponson, the underside tunnel surface forming a channel region along the catamaran boat hull centerline and between the first sponson and the second sponson through which water runs when the catamaran boat hull moves through the water;

an underside wave splitter disposed on a forward portion of the underside tunnel surface along the catamaran boat hull centerline, the underside wave splitter comprising a set of downward protruding side surfaces and a protruding aft surface; and a set of spray rails disposed along the underside tunnel surface, wherein each of the spray rails extend from the protruding aft surface of the underside wave splitter and away from the catamaran boat hull centerline.

A2. The catamaran boat hull of embodiment A1, wherein each of the downward protruding side surfaces of the underside wave splitter forming a bow-oriented splitting wedge relative to the forward portion of the underside tunnel surface.

A3. The catamaran boat hull of embodiment A1, wherein each of the downward protruding side surfaces of the underside wave splitter intersect the protruding aft surface of the underside wave splitter forming an aft-oriented spray edge relative to the forward portion of the underside tunnel surface.

A4. The catamaran boat hull of embodiment A1, wherein a first spray rail of the set of spray rails protrudes from the underside tunnel surface between a first side of the protruding aft surface of the underside wave splitter and the first sponson; and wherein a second spray rail of the set of spray rails protrudes from the underside tunnel surface between a second side of the protruding aft surface of the underside wave splitter and the second sponson.

A5. The catamaran boat hull of embodiment A4, wherein each of the first spray rail of the set of spray rails and the second spray rail of the set of spray rails disrupts spray from moving forward of the underside wave splitter.

A6. The catamaran boat hull of embodiment A4, wherein a first portion of the underside tunnel surface is defined between the first sponson and the first side of the protruding aft surface of the underside wave splitter; wherein a second portion of the underside tunnel surface is defined between the second sponson and the second side of the protruding aft surface of the underside wave splitter; wherein the first spray rail of the set of spray rails protrudes from the first portion of the underside tunnel surface to disrupt spray from moving forward of the underside wave splitter along the underside tunnel surface; and wherein the second spray rail of the set of spray rails protrudes from the second portion of the underside tunnel surface to disrupt spray from moving forward of the underside wave splitter along the underside tunnel surface.

A7. The catamaran boat hull of embodiment A4, wherein the first spray rail of the set of spray rails being in a first diversion orientation where a forward most end of the first spray rail of the set of spray rails being at an intersection of the first spray rail of the set of spray rails and the first side of the protruding aft surface of the underside wave splitter; and wherein the second spray rail of the set of spray rails being in a second diversion orientation where a forward most end of the second spray rail of the set of spray rails being at an intersection of the second spray rail of the set of spray rails and the second side of the protruding aft surface of the underside wave splitter.

A8. The catamaran boat hull of embodiment A4, wherein each of the first spray rail of the set of spray rails and the second spray rail of the set of spray rails forms an angle LS with a line normal to the catamaran boat hull centerline, wherein angle ∠S ranges from about 20° to about 25°.

A9. The catamaran boat hull of embodiment A4, wherein each of the first spray rail of the set of spray rails and the second spray rail of the set of spray rails disrupts spray from moving forward of the underside wave splitter and at least partially towards the protruding aft surface of the underside wave splitter.

A10. The catamaran boat hull of embodiment A4, wherein each of the first spray rail of the set of spray rails and the second spray rail of the set of spray rails has a spray rail height $H_{SR}$ of up to about 2.0 in.

A11. The catamaran boat hull of embodiment A4, wherein each of the first spray rail of the set of spray rails and the second spray rail of the set of spray rails has a spray rail height $H_{SR}$ that increases from a smaller spray rail height $H_{SR}$ adjacent sponson to a greater spray rail height $H_{SR}$ adjacent the underside wave splitter.

A12. The catamaran boat hull of embodiment A1, wherein the underside wave splitter has an overall length $L_{WS}$ of at least about 60.0 inches (in), an overall width $W_{WS}$ of at least 12.0 in, and a maximum depth $D_{WS}$ of at least about 10.0 in.

A13. The catamaran boat hull of embodiment A1, wherein the underside wave splitter has an overall length $L_{WS}$ of from about 60.0 in to about 90.0 in, an overall width $W_{WS}$ of from about 15.0 in to about 30.0 in, and a maximum depth $D_{WS}$ of from about 10.0 in to about 20.0 in.

A14. The catamaran boat hull of embodiment A1, wherein the underside wave splitter has a maximum depth $D_{WS}$ proximate an intersection of the downward protruding side surfaces and the protruding aft surface.

A15. The catamaran boat hull of embodiment A1, wherein the underside wave splitter has a cross-sectional V-shape within a plane perpendicular to the catamaran boat hull centerline.

A16. The catamaran boat hull of embodiment A1, wherein each of the downward protruding side surfaces and the protruding aft surface independently has three surface edges.

A17. The catamaran boat hull of embodiment A1, wherein the protruding aft surface forms an angle ∠W with a channel surface adjacent to the protruding aft surface, wherein angle ∠W ranges from about 85° to about 100°.

A18. A catamaran boat hull with improved running characteristics, the catamaran boat hull comprising:
a pair of hull sponsons comprising a first sponson and a second sponson, wherein the first sponson and the second sponson are disposed in parallel relative to a catamaran boat hull centerline;
an underside tunnel surface that couples the first sponson to the second sponson, the underside tunnel surface forming a channel region along the catamaran boat hull centerline and between the first sponson and the second sponson through which water runs when the catamaran boat hull moves through the water;
wherein each of the first sponson and the second sponson comprises:
an aft transom section,
a keel oriented along a sponson hull centerline of the first sponson or the second sponson, the keel extending from an intersection point with the aft transom section to an upward curving bow,
a sponson running surface disposed on each side of the keel extending from a running surface intersection with the aft transom section to the upward curving bow,
two longitudinal steps disposed at respectively different points along the keel and the sponson running surface, each of the two longitudinal steps running across a width $W_S$ of the first sponson or the second sponson,
wherein the two longitudinal steps divide the sponson running surface into an aft sponson running surface section, a mid-hull sponson running surface section, and a forward hull sponson running surface section,
wherein the mid-hull sponson running surface section being lower than the aft sponson running surface section at a first keel intersection between the aft sponson running surface section and the mid-hull sponson running surface section due to a first longitudinal steps of the two longitudinal steps, and
wherein the forward sponson running surface section being lower than the mid-hull sponson running surface section at a second keel intersection between the forward sponson running surface section and the mid-hull sponson running surface section due to a second longitudinal steps of the two longitudinal steps, and
two transverse steps disposed lengthwise on opposing sides of the keel, wherein a first transverse step of the two transverse steps being disposed between the keel and an inner chine of the first sponson or the second sponson, wherein a second transverse step of the two transverse steps being disposed between the keel and an outer chine of the first sponson or the second sponson,
wherein the two transverse steps further divide the aft sponson running surface section into an inner lifting pad running portion and two outer running surface portions, the inner lifting pad running portion of the aft sponson running surface being disposed between each of the outer running surface portions of the aft sponson running surface section as separated by each of the two transverse steps,
wherein the inner lifting pad running portion having a variable deadrise profile with a lower deadrise at an aft end of the inner lifting pad running portion that transitions to a higher deadrise at a forward end of the inner lifting pad running portion.

Further Embodiment B—Modified Lifting Pad & Transverse Steps

B1. A catamaran boat hull 100 with improved running characteristics, the catamaran boat hull 100 comprising: a pair of hull sponsons 10/12 comprising a first sponson 10 and a second sponson 12, wherein the first sponson 10 and the second sponson 12 are disposed in parallel relative to a catamaran boat hull centerline 11; an underside tunnel surface 14 that couples the first sponson 10 to the second sponson 12, the underside tunnel surface 14 forming a channel region 16 along the catamaran boat hull centerline 11 and between the first sponson 10 and the second sponson 12 through which water runs when the catamaran boat hull 100 moves through the water; wherein each of the first sponson 10 and the second sponson 12 comprises: an aft transom section 22, a keel 23 oriented along a sponson hull centerline 21 of the first sponson 10 or the second sponson 12, the keel 23 extending from an intersection point 24 with the aft transom section 22 to an upward curving bow 25, a sponson running surface 26 disposed on each side of the keel 23 extending from a running surface intersection 27 with the aft transom section 22 to the upward curving bow 25, two longitudinal steps 28/29 disposed at respectively different points along the keel 23 and the sponson running surface 26, each of the two longitudinal steps 28/29 running across a width $W_S$ of the first sponson 10 or the second sponson 12, and two transverse steps 38/39 disposed lengthwise on opposing sides of the keel 23, wherein a first transverse step 38 of the two transverse steps 38/39 being disposed between the keel 23 and an inner chine 31 of the first sponson 10 or the second sponson 12, wherein a second transverse step 39 of the two transverse steps 38/39 being disposed between the keel 23 and an outer chine 32 of the first sponson 10 or the second sponson 12, wherein the two transverse steps 38/39 further divide the aft sponson running surface section 26a into an inner lifting pad running portion 26ai and two outer running surface portions 26ao1/26ao2, the inner lifting pad running portion 26ai of the aft sponson running surface 26a being disposed between each of the outer running surface portions 26ao1/26ao2 of the aft sponson running surface section 26a as separated by each of the two transverse steps 38/39, wherein the inner lifting pad running portion 26ai having a variable deadrise profile with a lower deadrise at an aft end 33 of the inner lifting pad running portion 26ai that transitions to a higher deadrise at a forward end 34 of the inner lifting pad running portion 26ai.

B2. The catamaran boat hull 100 of embodiment B1, wherein the inner lifting pad running portion 26ai provides a combination of lift and a reduction of resistance on at least the aft sponson running surface section 26a during operation of the catamaran boat hull 100 through water.

B3. The catamaran boat hull 100 of embodiment B1 or B2, wherein the two longitudinal steps 28/29 introduce air to at least a portion of the sponson running surface 26 during operation of the catamaran boat hull 100 through water.

B4. The catamaran boat hull 100 of any one of embodiments B1 to B3, wherein the two transverse steps 38/39 each provide a lengthwise guide for at least a portion of the air introduced to the at least a portion of the sponson running surface 26.

B5. The catamaran boat hull 100 of any one of embodiments B1 to B4, wherein each of the two transverse steps 38/39 further divide the mid-hull sponson running surface section 26b into an inner mid-hull running portion 26bi and two outer mid-hull running surface portions 26bo1/26bo2.

B6. The catamaran boat hull 100 of any one of embodiments B1 to B5, wherein a first longitudinal step 28 of the two longitudinal steps 28/29 introduces air to the aft sponson running surface section 26a during operation of the catamaran boat hull 100 through water, and wherein a second longitudinal step 29 of the two longitudinal steps 28/29 introduces air to the mid-hull sponson running surface section 26b during operation of the catamaran boat hull 100 through water.

B7. The catamaran boat hull 100 of any one of embodiments B1 to B6, wherein the transverse steps 38/39 each provide a lengthwise guide for at least a portion of the air introduced to the mid-hull sponson running surface section 26b and the aft sponson running surface section 26a.

B8. The catamaran boat hull 100 of any one of embodiments B1 to B7, wherein each of the two transverse steps 38/39 further divide at least a widthwise portion of the forward hull sponson running surface section 26c.

B9. The catamaran boat hull 100 of any one of embodiments B1 to B8, wherein each of the two transverse steps 38/39 further divide the forward hull sponson running surface section 26c into an inner forward hull sponson running surface section 26ci and two outer forward hull sponson running surface portions 26co1/26co2.

B10. The catamaran boat hull 100 of any one of embodiments B1 to B9, wherein each of the transverse steps 38/39 also introduces additional air from forward of the second longitudinal step 29 of the two longitudinal steps 28/29 to at least the mid-hull sponson running surface section 26b resulting in a further reduction of friction on the sponson running surface 26 during operation of the catamaran boat hull 100 through water.

B11. The catamaran boat hull 100 of any one of embodiments B1 to B10, wherein each of the transverse steps 38/39 has a smooth, curved (i.e., concave) step profile as transverse step 38 or 39 goes from (1) an aft sponson running surface section 26a to one of outer running surface portions 26ao1/26ao2, (2) a mid-hull sponson running surface section 26b to one of two outer mid-hull running surface portions 26bo1/26bo2, and (3) a forward hull sponson running surface section 26c to one of two outer forward hull sponson running surface portions 26co1/26co2.

B12. The catamaran boat hull 100 of any one of embodiments B1 to B11, wherein each of the two longitudinal steps 28/29 independently has a longitudinal step height $H_{LS}$ of at least 1.0 in.

B13. The catamaran boat hull 100 of any one of embodiments B1 to B12, wherein each of the two longitudinal steps 28/29 independently has a longitudinal step height $H_{LS}$ that varies from about 1.0 in to about 2.0 in along a width of each of the two longitudinal steps 28/29.

B14. The catamaran boat hull 100 of any one of embodiments B1 to B13, wherein each of the two longitudinal steps 28/29 independently has a curved step profile such that an inner longitudinal step portion is closer to the aft transom section 22 than outer longitudinal step portions along opposite sides of the inner longitudinal step portion.

B15. The catamaran boat hull 100 of any one of embodiments B1 to B14, wherein each longitudinal step 28/29 independently has a step profile along opposite outer edges (i.e., adjacent inner chine 31 and outer chine 32 on hull sponsons 10/12) that include at least one of: (1) a curved longitudinal step portion 281 with an outer edge portion of the curved longitudinal step portion 281 being further away from aft transom section 22, and (2) an edge offset 285 wherein longitudinal step 28 or 29 meets the hull side.

B16. The catamaran boat hull 100 of any one of embodiments B1 to B15, wherein each longitudinal step 28/29 independently has a step profile along opposite outer edges (i.e., adjacent inner chine 31 and outer chine 32 on hull sponsons 10/12) that include both: (1) a curved longitudinal step portion 281 with an outer edge portion of the curved longitudinal step portion 281 being further away from aft transom section 22, and (2) an edge offset 285 wherein longitudinal step 28 or 29 meets the hull side.

B17. The catamaran boat hull 100 of embodiment B15 or B16, wherein each edge offset 285 has an edge offset width of from about 0.5 inches to about 1.0 inches.

B18. The catamaran boat hull 100 of any one of embodiments B1 to B17, wherein each of the two transverse steps 38/39 independently has a transverse step height $H_{TS}$ of at least 1.0 in.

B19. The catamaran boat hull 100 of any one of embodiments B1 to B18, wherein each of the two transverse steps 38/39 independently has a transverse step height $H_{TS}$ that varies from about 1.0 in to about 4.0 in along a length of each of the two transverse steps 38/39.

B20. The catamaran boat hull 100 of any one of embodiments B1 to B19, wherein each of the transverse steps 38/39 extend in substantially straight lines lengthwise along opposing sides of the keel 23 (e.g., when viewed from a bottom of the catamaran boat hull 100).

Further Embodiment C—Improved Step Shape for Longitudinal and Transverse Steps

C1. A catamaran boat hull 100 with improved running characteristics, the catamaran boat hull 100 comprising: a pair of hull sponsons 10/12 comprising a first sponson 10 and a second sponson 12, wherein the first sponson 10 and the second sponson 12 are disposed in parallel relative to a catamaran boat hull centerline 11; an underside tunnel surface 14 that couples the first sponson 10 to the second sponson 12, the underside tunnel surface 14 forming a channel region 16 along the catamaran boat hull centerline 11 and between the first sponson 10 and the second sponson 12 through which water runs when the catamaran boat hull 100 moves through the water; wherein each of the first sponson 10 and the second sponson 12 comprises: an aft transom section 22, a keel 23 oriented along a sponson hull centerline 21 of the first sponson 10 or the second sponson 12, the keel 23 extending from an intersection point 24 with the aft transom section 22 to an upward curving bow 25, a sponson running surface 26 disposed on each side of the keel 23 extending from a running surface intersection 27 with the aft transom section 22 to the upward curving bow 25, two longitudinal steps 28/29 disposed at respectively different points along the keel 23 and the sponson running surface 26, each of the two longitudinal steps 28/29 running across a width $W_S$ of the first sponson 10 or the second sponson 12, wherein the two longitudinal steps 28/29 divide the sponson running surface 26 into an aft sponson running surface section 26a, a mid-hull sponson running surface section 26b, and a forward hull sponson running surface section 26c, wherein the mid-hull sponson running surface section 26b being lower than the aft sponson running surface section 26a at a first keel intersection 261 between the aft sponson running surface section 26a and the mid-hull sponson running surface section 26b due to a first longitudinal steps 28 of the two longitudinal steps 28/29, and wherein the forward sponson running surface section 26c being lower than the mid-hull sponson running surface section 26b at a second keel intersection 262 between the forward sponson running surface section 26c and the mid-hull sponson running surface section 26b due to a second longitudinal steps 29 of the two longitudinal steps 28/29, and wherein each of the two longitudinal steps 28/29 independently has a step surface profile that varies along (i) a height $H_{LS}$ of each of the two longitudinal steps 28/29, (ii) a length $L_{LS}$ of each of the two longitudinal steps 28/29, or (iii) both (i) and (ii).

C2. The catamaran boat hull 100 of embodiment C1, wherein each of the two longitudinal steps 28/29 independently has a step surface profile that varies along (i) a height $H_{LS}$ of each of the two longitudinal steps 28/29.

C3. The catamaran boat hull 100 of embodiment C1 or C2, wherein each of the two longitudinal steps 28/29 independently has a concave or convex step surface profile along (i) a height $H_{LS}$ of each of the two longitudinal steps 28/29.

C4. The catamaran boat hull 100 of any one of embodiments C1 to C3, wherein each of the two longitudinal steps 28/29 independently has a step surface profile that varies along (ii) a length $L_{LS}$ of each of the two longitudinal steps 28/29.

C5. The catamaran boat hull 100 of any one of embodiments C1 to C4, wherein the two longitudinal steps 28/29 introduce air to at least a portion of the sponson running surface 26 during operation of the catamaran boat hull 100 through water.

C6. The catamaran boat hull 100 of any one of embodiments C1 to C5, wherein a first longitudinal step 28 of the two longitudinal steps 28/29 introduces air to the aft sponson running surface section 26a during operation of the catamaran boat hull 100 through water, and wherein a second longitudinal step 29 of the two longitudinal steps 28/29 introduces air to the mid-hull sponson running surface section 26b during operation of the catamaran boat hull 100 through water.

C7. The catamaran boat hull 100 of any one of embodiments C1 to C6, wherein each of the two longitudinal steps 28/29 independently has a longitudinal step height $H_{LS}$ of at least 1.0 in.

C8. The catamaran boat hull 100 of any one of embodiments C1 to C7, wherein each of the two longitudinal steps 28/29 independently has a longitudinal step height $H_{LS}$ that varies from about 1.0 in to about 4.0 in along a width of each of the two longitudinal steps 28/29.

C9. The catamaran boat hull 100 of any one of embodiments C1 to C8, wherein each of the two longitudinal steps 28/29 independently has a curved step profile such that an inner longitudinal step portion is closer to the aft transom section 22 than outer longitudinal step portions along opposite sides of the inner longitudinal step portion.

C10. The catamaran boat hull 100 of any one of embodiments C1 to C9, wherein each longitudinal step 28/29 independently has a step profile along opposite outer edges (i.e., adjacent inner chine 31 and outer chine 32 on hull sponsons 10/12) that include at least one of: (1) a curved longitudinal step portion 281 with an outer edge portion of the curved longitudinal step portion 281 being further away from aft transom section 22, and (2) an edge offset 285 wherein longitudinal step 28 or 29 meets the hull side.

C11. The catamaran boat hull 100 of any one of embodiments C1 to C10, wherein each longitudinal step 28/29 independently has a step profile along opposite outer edges (i.e., adjacent inner chine 31 and outer chine 32 on hull sponsons 10/12) that include both: (1) a curved longitudinal step portion 281 with an outer edge portion of the curved longitudinal step portion 281 being further away from aft transom section 22, and (2) an edge offset 285 wherein longitudinal step 28 or 29 meets the hull side.

C12. The catamaran boat hull 100 of embodiment C10 or C11, wherein each edge offset 285 has an edge offset width of from about 0.5 inches to about 1.0 inches.

C13. The catamaran boat hull 100 of any one of embodiments C1 to C12, further comprising: two transverse steps 38/39 disposed lengthwise on opposing sides of the keel 23, wherein a first transverse step 38 of the two transverse steps 38/39 being disposed between the keel 23 and an inner chine 31 of the first sponson 10 or the second sponson 12, wherein a second transverse step 39 of the two transverse steps 38/39 being disposed between the keel 23 and an outer chine 32 of the first sponson 10 or the second sponson 12, wherein the two transverse steps 38/39 further divide the aft sponson running surface section 26a into an inner lifting pad running portion 26ai and two outer running surface portions 26ao1/26ao2, the inner lifting pad running portion 26ai of the aft sponson running surface 26ai being disposed between each of the outer running surface portions 26ao1/26ao2 of the aft sponson running surface section 26a as separated by each of the two transverse steps 38/39, wherein the inner lifting pad running portion 26ai having a variable deadrise profile with a lower deadrise at an aft end 33 of the inner lifting pad running portion 26ai that transitions to a higher deadrise at a forward end 34 of the inner lifting pad running portion 26ai.

C14. The catamaran boat hull 100 of embodiment C13, wherein the inner lifting pad running portion 26ai provides a combination of lift and a reduction of resistance on at least the aft sponson running surface section 26a during operation of the catamaran boat hull 100 through water.

C15. The catamaran boat hull 100 of embodiment C13 or C14, wherein the two transverse steps 38/39 each provide a lengthwise guide for at least a portion of the air introduced to the at least a portion of the sponson running surface 26.

C16. The catamaran boat hull 100 of any one of embodiments C13 to C15, wherein each of the two transverse steps 38/39 further divide the mid-hull sponson running surface section 26b into an inner mid-hull running portion 26bi and two outer mid-hull running surface portions 26bo1/26bo2.

C17. The catamaran boat hull 100 of any one of embodiments C13 to C16, wherein the transverse steps 38/39 each provide a lengthwise guide for at least a portion of the air introduced to the mid-hull sponson running surface section 26b and the aft sponson running surface section 26a.

C18. The catamaran boat hull 100 of any one of embodiments C13 to C17, wherein each of the two transverse steps 38/39 further divide at least a widthwise portion of the forward hull sponson running surface section 26c.

C19. The catamaran boat hull 100 of any one of embodiments C13 to C18, wherein each of the two transverse steps 38/39 further divide the forward hull sponson running surface section 26c into an inner forward hull sponson running surface section 26ci and two outer forward hull sponson running surface portions 26co1/26co2.

C20. The catamaran boat hull 100 of any one of embodiments C13 to C19, wherein each of the transverse steps 38/39 also introduces additional air from forward of the second longitudinal step 29 of the two longitudinal steps 28/29 to at least the mid-hull sponson running surface section 26b resulting in a further reduction of friction on the sponson running surface 26 during operation of the catamaran boat hull 100 through water.

C21. The catamaran boat hull 100 of any one of embodiments C13 to C20, wherein each of the two transverse steps 38/39 independently has a transverse step height $H_{TS}$ of at least 1.0 in.

C22. The catamaran boat hull 100 of any one of embodiments C13 to C21, wherein each of the two transverse steps 38/39 independently has a transverse step height $H_{TS}$ that varies from about 1.0 in to about 2.5 in along a length of each of the two transverse step height $H_{TS}$.

C23. The catamaran boat hull 100 of any one of embodiments C13 to C22, wherein each of the transverse steps 38/39 extend in substantially straight lines lengthwise along opposing sides of the keel 23 (e.g., when viewed from a bottom of the catamaran boat hull 100).

C24. The catamaran boat hull 100 of any one of embodiments C13 to C23, wherein each of the transverse steps 38/39 has a smooth, curved (i.e., concave) step profile as transverse step 38 or 39 goes from (1) an aft sponson running surface section 26a to one of outer running surface portions 26ao1/26ao2, (2) a mid-hull sponson running surface section 26b to one of two outer mid-hull running surface portions 26bo1/26bo2, and (3) a forward hull sponson running surface section 26c to one of two outer forward hull sponson running surface portions 26co1/26co2.

Further Embodiment D—Use of Radiused Chines on Hull Sponsons

D1. A catamaran boat hull 100 with improved running characteristics, the catamaran boat hull 100 comprising: a pair of hull sponsons 10/12 comprising a first sponson 10 and a second sponson 12, wherein the first sponson 10 and the second sponson 12 are disposed in parallel relative to a catamaran boat hull centerline 11; an underside tunnel surface 14 that couples the first sponson 10 to the second sponson 12, the underside tunnel surface 14 forming a channel region 16 along the catamaran boat hull centerline 11 and between the first sponson 10 and the second sponson 12 through which water runs when the catamaran boat hull 100 moves through the water; wherein each of the first sponson 10 and the second sponson 12 comprises: an aft transom section 22, a keel 23 oriented along a sponson hull centerline 21 of the first sponson 10 or the second sponson 12, the keel 23 extending from an intersection point 24 with the aft transom section 22 to an upward curving bow 25, a sponson running surface 26 disposed on each side of the keel 23 extending from a running surface intersection 27 with the aft transom section 22 to the upward curving bow 25, wherein the sponson running surface 26 comprises (a) an angled sponson running surface $26_{RT}$ extending along an outer portion of the sponson running surface 26 between (i) the keel 23 and (i) either an inner chine 31 or an outer chine 32, (b) an outermost sponson running surface edge $26_{OM}$ adjacent either the inner chine 31 or the outer chine 32, and (c) a transition angle ∠T between the angled sponson running surface $26_{RT}$ and the outermost sponson running surface edge $26_{OM}$, wherein a transition surface $26_{ST}$ between the angled sponson running surface $26_{RT}$ and the outermost sponson running surface edge $26_{OM}$ is represented by a smooth, arc-shaped curve.

D2. The catamaran boat hull 100 of embodiment D1, wherein the outermost sponson running surface edge $26_{OM}$ is oriented horizontally.

D3. The catamaran boat hull 100 of embodiment D1 or D2, wherein the transition angle ∠T is greater than 90° up to about 165°.

D4. The catamaran boat hull 100 of embodiment D1 or D3, wherein the transition angle ∠T is from about 120° up to about 160°.

D5. The catamaran boat hull 100 of embodiment D1 or D4, wherein the transition angle ∠T is from about 150° to about 157°.

D6. The catamaran boat hull 100 of embodiment D1 or D5, wherein the smooth, arc-shaped curve has a curve length $L_C$ of from about 1.0 in to about 6.0 in.

D7. The catamaran boat hull 100 of embodiment D1 or D6, wherein the smooth, arc-shaped curve has a curve length $L_C$ of about 6.0 in.

D8. The catamaran boat hull 100 of any one of embodiments D1 to D7, wherein the catamaran boat hull 100 further comprises: two longitudinal steps 28/29 disposed at respectively different points along the keel 23 and the sponson running surface 26, each of the two longitudinal steps 28/29 running across a width $W_S$ of the first sponson 10 or the second sponson 12, wherein the two longitudinal steps 28/29 divide the sponson running surface 26 into an aft sponson running surface section 26a, a mid-hull sponson running surface section 26b, and a forward hull sponson running surface section 26c, wherein the mid-hull sponson running surface section 26b being lower than the aft sponson running surface section 26a at a first keel intersection 261 between the aft sponson running surface section 26a and the mid-hull sponson running surface section 26b due to a first longitudinal steps 28 of the two longitudinal steps 28/29, and wherein the forward sponson running surface section 26c being lower than the mid-hull sponson running surface section 26b at a second keel intersection 262 between the forward sponson running surface section 26c and the mid-hull sponson running surface section 26b due to a second longitudinal steps 29 of the two longitudinal steps 28/29.

D9. The catamaran boat hull 100 of embodiment D8, wherein each of (1) the aft sponson running surface section 26a, (2) the mid-hull sponson running surface section 26b, and (3) the forward hull sponson running surface section 26c independently comprises (a) an angled sponson running surface $26_{RT}$ extending along an outer portion of the aft sponson running surface section 26a, the mid-hull sponson running surface section 26b, and the forward hull sponson running surface section 26c, (b) an outermost sponson running surface edge $26_{OM}$ adjacent either of the inner chine 31 or the outer chine 32 along each of the aft sponson running surface section 26a, the mid-hull sponson running surface section 26b, and the forward hull sponson running surface section 26c, and (c) a transition angle ∠T between the angled sponson running surface $26_{RT}$ and the outermost sponson running surface edge $26_{OM}$, and wherein a transition surface $26_{ST}$ between the angled sponson running surface $26_{RT}$ and the outermost sponson running surface edge $26_{OM}$ is represented by a smooth, arc-shaped curve for each of the aft sponson running surface section 26a, the mid-hull sponson running surface section 26b, and the forward hull sponson running surface section 26c.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A catamaran boat hull with improved running characteristics, the catamaran boat hull comprising:
   a pair of hull sponsons comprising a first sponson and a second sponson, wherein the first sponson and the second sponson are disposed in parallel relative to a catamaran boat hull centerline;
   an underside tunnel surface that couples the first sponson to the second sponson, the underside tunnel surface forming a channel region along the catamaran boat hull centerline and between the first sponson and the second sponson through which water runs when the catamaran boat hull moves through the water;
   wherein each of the first sponson and the second sponson comprises:
      an aft transom section,
      a keel oriented along a sponson hull centerline of the first sponson or the second sponson, the keel extending from an intersection point with the aft transom section to an upward curving bow,
      a sponson running surface disposed on each side of the keel extending from a running surface intersection with the aft transom section to the upward curving bow,
      two longitudinal steps disposed at respectively different points along the keel and the sponson running surface, each of the two longitudinal steps running across a width $W_S$ of the first sponson or the second sponson, and
      two transverse steps disposed lengthwise on opposing sides of the keel, wherein a first transverse step of the two transverse steps being disposed between the keel and an inner chine of the first sponson or the second sponson, and wherein a second transverse step of the two transverse steps being disposed between the keel and an outer chine of the first sponson or the second sponson,
      wherein the two longitudinal steps divide the sponson running surface into
         an aft sponson running surface section,
         a mid-hull sponson running surface section, and
         a forward hull sponson running surface section,
         wherein the mid-hull sponson running surface section being lower than the aft sponson running surface section at a first keel intersection between the aft sponson running surface section and the mid-hull sponson running surface section due to a first longitudinal step of the two longitudinal steps, and wherein the forward sponson running surface section being lower than the mid-hull sponson running surface section at a second keel intersection between the forward sponson running surface section and the mid-hull sponson running surface section due to a second longitudinal step of the two longitudinal steps,
      wherein each of the two longitudinal steps independently has a step surface profile that varies along at least one of (i) a height $H_{LS}$ of each of the two longitudinal steps, and (ii) a length $L_{LS}$ of each of the two longitudinal steps,
      wherein each of the two longitudinal steps has a first step edge profile along opposing outer edges of the respective first sponson and the respective second sponson, wherein the first step edge profile comprises at least one of:
         (i) a curved longitudinal step portion disposed on the opposing outer edges with an outer edge portion of the curved longitudinal step portion being further away from aft transom section, and
         (ii) an inward step edge offset where each of the two longitudinal steps meets a side of the respective first sponson and the respective second sponson,
      wherein the at least one of (i) the curved longitudinal step portion, and (ii) the inward step edge offset providing enhanced air flow into a channel extending along the length $L_{LS}$ of each of the two longitudinal steps, and
      wherein the two transverse steps divide the aft sponson running surface section into an inner lifting pad running portion and two outer running surface portions, the inner lifting pad running portion of the aft sponson running surface being disposed between each of the outer running surface portions of the aft sponson running surface section as separated by each of the two transverse steps, wherein the inner lifting pad running portion having a variable deadrise profile with a lower deadrise at an aft end of the inner lifting pad running portion that transitions to a higher deadrise at a forward end of the inner lifting pad running portion.

2. The catamaran boat hull of claim 1, wherein the inner lifting pad running portion spans either side of the keel and provides a combination of lift and a reduction of resistance on at least the aft sponson running surface section during operation of the catamaran boat hull through water.

3. The catamaran boat hull of claim 2, wherein a first longitudinal step of the two longitudinal steps introduces air to the aft sponson running surface section during operation of the catamaran boat hull through water, and wherein a second longitudinal step of the two longitudinal steps introduces air to the mid-hull sponson running surface section during operation of the catamaran boat hull through water; and
   wherein the transverse steps each provide a lengthwise guide for at least a portion of the air introduced to each of the mid-hull sponson running surface section and the aft sponson running surface section.

4. The catamaran boat hull of claim 1, wherein the two transverse steps divide the mid-hull sponson running surface section into two outer mid-hull running surface portions and at least partially divide the forward hull sponson running surface section into two outer forward hull sponson running surface portions; and
   wherein each of the two transverse steps has a first curved step profile as the respective one of the transverse steps extends (1) from the aft sponson running surface section to one of the two outer running surface portions, (2) from the mid-hull sponson running surface section to one of two outer mid-hull running surface portions, and (3) from the forward hull sponson running surface section to one of two outer forward hull sponson running surface portions.

5. The catamaran boat hull of claim 4, wherein each of the two longitudinal steps independently has that comprises (1) the curved longitudinal step portion with an outer edge portion of the curved longitudinal step portion being further away from the aft transom section, and (2) the edge offset wherein the longitudinal step meets an outer side of the respective hull sponson.

6. The catamaran boat hull of claim 1, wherein the first step surface profile for each of the two longitudinal steps comprises the curved longitudinal step portion disposed on the opposing outer edges with an outer edge portion of the curved longitudinal step portion being further away from aft transom section.

7. The catamaran boat hull of claim 1, wherein the first step surface profile for each of the two longitudinal steps comprises the inward step edge offset where each of the two longitudinal steps meets a side of the respective first sponson and the second sponson.

8. The catamaran boat hull of claim 1, wherein the first step surface profile for each of the two longitudinal steps comprises:
  (i) the curved longitudinal step portion disposed on the opposing outer edges with an outer edge portion of the curved longitudinal step portion being further away from aft transom section; and
  (ii) the inward step edge offset where each of the two longitudinal steps meets a side of the respective first sponson and the respective second sponson.

9. The catamaran boat hull of claim 8, wherein the two transverse steps divide the mid-hull sponson running surface section into an inner mid-hull running surface portion and two outer mid-hull running surface portions and at least partially divide the forward hull sponson running surface section into an inner forward hull sponson running surface section and two outer forward hull sponson running surface portions; and
  wherein each of the two transverse steps has a first curved step profile as the respective one of the transverse steps extends (1) from the aft sponson running surface section to one of the two outer running surface portions, (2) from the mid-hull sponson running surface section to one of two outer mid-hull running surface portions, and (3) from the forward hull sponson running surface section to one of two outer forward hull sponson running surface portions.

10. The catamaran boat hull of claim 8, wherein the first curved step profile comprises a concave step profile.

11. The catamaran boat hull of claim 1, further comprising:
  an underside wave splitter disposed on the underside tunnel surface along the catamaran boat hull centerline, the underside wave splitter comprising at least a set of downward protruding side surfaces and a protruding aft surface; and
  a set of spray rails disposed along the underside tunnel surface and aft of the underside wave splitter, wherein each of the spray rails extend from the protruding aft surface of the underside wave splitter and away from the catamaran boat hull centerline.

12. The catamaran boat hull of claim 1, wherein the sponson running surface comprises an angled sponson running surface extending along an outer portion of the sponson running surface between (i) the keel and (ii) one of the inner chine or the outer chine;
  an outermost sponson running surface edge adjacent either the inner chine or the outer chine; and
  a transition angle $\angle T$ between the angled sponson running surface and the outermost sponson running surface edge, wherein a transition surface between the angled sponson running surface and the outermost sponson running surface edge is represented by a smooth, arc-shaped curve.

13. A catamaran boat hull with improved running characteristics, the catamaran boat hull comprising:
  a pair of hull sponsons comprising a first sponson and a second sponson, wherein the first sponson and the second sponson are disposed in parallel relative to a catamaran boat hull centerline;
  an underside tunnel surface that couples the first sponson to the second sponson, the underside tunnel surface forming a channel region along the catamaran boat hull centerline and between the first sponson and the second sponson through which water runs when the catamaran boat hull moves through the water;
  wherein each of the first sponson and the second sponson comprises:
    an aft transom section,
    a keel oriented along a sponson hull centerline of the first sponson or the second sponson, the keel extending from an intersection point with the aft transom section to an upward curving bow,
    a sponson running surface disposed on each side of the keel extending from a running surface intersection with the aft transom section to the upward curving bow,
    two longitudinal steps disposed at respectively different points along the keel and the sponson running surface, each of the two longitudinal steps running across a width $W_S$ of the first sponson or the second sponson, and
    two transverse steps disposed lengthwise on opposing sides of the keel, wherein a first transverse step of the two transverse steps being disposed between the keel and an inner chine of the first sponson or the second sponson, and wherein a second transverse step of the two transverse steps being disposed between the keel and an outer chine of the first sponson or the second sponson,
  wherein the two longitudinal steps divide the sponson running surface into an aft sponson running surface section, a mid-hull sponson running surface section, and a forward hull sponson running surface section,
  wherein each of the two longitudinal steps has a first step edge profile along opposing outer edges of the respective first sponson and the respective second sponson, wherein the first step edge profile comprises at least one of:
    (i) a curved longitudinal step portion disposed on the opposing outer edges with an outer edge portion of the curved longitudinal step portion being further away from aft transom section, and
    (ii) an inward step edge offset where each of the two longitudinal steps meets a side of the respective first sponson and the respective second sponson,
  wherein the at least one of the curved longitudinal step portion and the inward step edge offset providing enhanced air flow into a channel extending along a length $L_{LS}$ of each of the two longitudinal steps, and
  wherein the two transverse steps divide the aft sponson running surface section into a variable deadrise inner lifting pad running portion and two outer running surface portions, the variable deadrise inner lifting pad running portion of the aft sponson running surface being disposed between each of the outer running surface portions of the aft sponson running surface section as separated by each of the two transverse steps, wherein the variable deadrise inner lifting pad running portion having a lower deadrise at an aft end of the variable deadrise inner lifting pad running portion that transitions to a higher deadrise at a forward end of the variable deadrise inner lifting pad running portion.

14. The catamaran boat hull of claim 13, wherein the variable deadrise inner lifting pad running portion spans either side of the keel and provides a combination of lift and a reduction of resistance on at least the aft sponson running surface section during operation of the catamaran boat hull through water.

15. The catamaran boat hull of claim 14, wherein a first longitudinal step of the two longitudinal steps introduces air to the aft sponson running surface section during operation of the catamaran boat hull through water, and wherein a second longitudinal step of the two longitudinal steps introduces air to the mid-hull sponson running surface section during operation of the catamaran boat hull through water; and
wherein the transverse steps each provide a lengthwise guide for at least a portion of the air introduced to each of the mid-hull sponson running surface section and the aft sponson running surface section.

16. The catamaran boat hull of claim 13, wherein the two transverse steps divide the mid-hull sponson running surface section into two outer mid-hull running surface portions and at least partially divide the forward hull sponson running surface section into two outer forward hull sponson running surface portions; and
wherein each of the two transverse steps has a first curved step profile as the respective one of the transverse steps extends (1) from the aft sponson running surface section to one of the two outer running surface portions, (2) from the mid-hull sponson running surface section to one of two outer mid-hull running surface portions, and (3) from the forward hull sponson running surface section to one of two outer forward hull sponson running surface portions.

17. The catamaran boat hull of claim 16, wherein each of the two longitudinal steps independently has a step profile along opposite outer edges of the respective hull sponson that comprises (1) a curved longitudinal step portion with an outer edge portion of the curved longitudinal step portion being further away from the aft transom section, and (2) an edge offset wherein the longitudinal step meets an outer side of the respective hull sponson.

18. The catamaran boat hull of claim 13, wherein the variable deadrise inner lifting pad running portion has a first deadrise range from 16 to 22 degrees; and wherein each of the outer running surface portions has a second deadrise range from 22 to 24 degrees.

19. The catamaran boat hull of claim 13, wherein the first step surface profile for each of the two longitudinal steps comprises a second step edge profile including both the curved longitudinal step portion and the inward step edge offset.

20. The catamaran boat hull of claim 19, wherein each of the curved longitudinal step portion and the inward step edge offset combine to provide enhanced air flow into the channel extending along the length $L_{LS}$ of each of the two longitudinal steps.

21. The catamaran boat hull of claim 13, wherein the two transverse steps divide the mid-hull sponson running surface section into an inner mid-hull running surface portion and two outer mid-hull running surface portions and at least partially divide the forward hull sponson running surface section into an inner forward hull running surface section and two outer forward hull sponson running surface portions; and
wherein each of the two transverse steps has a first curved step profile as the respective one of the transverse steps extends (1) from the aft sponson running surface section to one of the two outer running surface portions, (2) from the mid-hull sponson running surface section to one of two outer mid-hull running surface portions, and (3) from the forward hull sponson running surface section to one of two outer forward hull sponson running surface portions.

22. The catamaran boat hull of claim 13, further comprising:
an underside wave splitter disposed on the underside tunnel surface along the catamaran boat hull centerline, the underside wave splitter comprising at least a set of downward protruding side surfaces and a protruding aft surface; and
a set of spray rails disposed along the underside tunnel surface and aft of the underside wave splitter, wherein each of the spray rails extend from the protruding aft surface of the underside wave splitter and away from the catamaran boat hull centerline to disrupt spray from moving forward of the underside wave splitter.

23. The catamaran boat hull of claim 22, wherein the set of spray rails comprises a first spray rail and a second spray rail;
wherein the first spray rail protrudes from the underside tunnel surface between a first side of the protruding aft surface of the underside wave splitter and the first sponson; and
wherein the second spray rail protrudes from the underside tunnel surface between a second side of the protruding aft surface of the underside wave splitter and the second sponson.

24. The catamaran boat hull of claim 13, wherein the sponson running surface comprises:
an angled sponson running surface extending along an outer portion of the sponson running surface between (i) the keel and (ii) one of the inner chine or the outer chine;
an outermost sponson running surface edge adjacent either the inner chine or the outer chine; and
a transition angle ∠T between the angled sponson running surface and the outermost sponson running surface edge, wherein a transition surface disposed between the angled sponson running surface and the outermost sponson running surface edge is represented by a smooth, arc-shaped curve.

25. A catamaran boat hull with improved running characteristics, the catamaran boat hull comprising:
a pair of hull sponsons comprising a first sponson and a second sponson, wherein the first sponson and the second sponson are disposed in parallel relative to a catamaran boat hull centerline;
an underside tunnel surface that couples the first sponson to the second sponson, the underside tunnel surface forming a channel region along the catamaran boat hull centerline and between the first sponson and the second sponson through which water runs when the catamaran boat hull moves through the water;
an underside wave splitter disposed on the underside tunnel surface along the catamaran boat hull centerline, the underside wave splitter comprising at least a set of downward protruding side surfaces and a protruding aft surface; and
a set of spray rails disposed along the underside tunnel surface and aft of the underside wave splitter, wherein each of the spray rails extend from the protruding aft surface of the underside wave splitter and away from the catamaran boat hull centerline to disrupt spray from moving forward of the underside wave splitter; and wherein each of the first sponson and the second sponson comprises:

an aft transom section, a keel oriented along a sponson hull centerline of the first sponson or the second sponson, the keel extending from an intersection point with the aft transom section to an upward curving bow, a sponson running surface disposed on each side of the keel extending from a running surface intersection with the aft transom section to the upward curving bow, two longitudinal steps disposed at respectively different points along the keel and the sponson running surface, each of the two longitudinal steps running across a width $W_S$ of the first sponson or the second sponson, and two transverse steps disposed lengthwise on opposing sides of the keel, wherein a first transverse step of the two transverse steps being disposed between the keel and an inner chine of the first sponson or the second sponson, and wherein a second transverse step of the two transverse steps being disposed between the keel and an outer chine of the first sponson or the second sponson, wherein the two longitudinal steps divide the sponson running surface into an aft sponson running surface section, a mid-hull sponson running surface section, and a forward hull sponson running surface section, wherein each of the two longitudinal steps has a step edge profile along opposing outer edges of the respective first sponson and the respective second sponson, wherein the step edge profile comprises at least one of:

(i) a curved longitudinal step portion disposed on the opposing outer edges with an outer edge portion of the curved longitudinal step portion being further away from aft transom section, and (ii) an inward step edge offset where each of the two longitudinal steps meets a side of the respective first sponson and the respective second sponson, wherein the two transverse steps divide the aft sponson running surface section into an inner lifting pad running portion and two outer running surface portions, the inner lifting pad running portion of the aft sponson running surface being disposed between each of the outer running surface portions of the aft sponson running surface section as separated by each of the two transverse steps, wherein the inner lifting pad running portion having a variable deadrise profile with a lower deadrise at an aft end of the inner lifting pad running portion that transitions to a higher deadrise at a forward end of the inner lifting pad running portion.

26. The catamaran boat hull of claim 25, wherein the set of spray rails comprises a first spray rail and a second spray rail;

wherein the first spray rail protrudes from the underside tunnel surface between a first side of the protruding aft surface of the underside wave splitter and the first sponson; and wherein the second spray rail protrudes from the underside tunnel surface between a second side of the protruding aft surface of the underside wave splitter and the second sponson.

27. The catamaran boat hull of claim 26, wherein each of the first spray rail and the second spray rail having a spray rail height $H_{SR}$ that increases from a smaller spray rail height $H_{SR}$ adjacent one of the first sponson or the second sponson to a greater spray rail height $H_{SR}$ adjacent the protruding aft surface of the underside wave splitter.

28. A catamaran boat hull with improved running characteristics, the catamaran boat hull comprising:

a pair of hull sponsons comprising a first sponson and a second sponson, wherein the first sponson and the second sponson are disposed in parallel relative to a catamaran boat hull centerline;

an underside tunnel surface that couples the first sponson to the second sponson, the underside tunnel surface forming a channel region along the catamaran boat hull centerline and between the first sponson and the second sponson through which water runs when the catamaran boat hull moves through the water;

wherein each of the first sponson and the second sponson comprises:

an aft transom section, a keel oriented along a sponson hull centerline of the first sponson or the second sponson, the keel extending from an intersection point with the aft transom section to an upward curving bow, an inner chine disposed proximate the underside tunnel surface, an outer chine disposed on an opposite side of the sponson than the inner chine, a sponson running surface disposed on each side of the keel extending from a running surface intersection with the aft transom section to the upward curving bow, wherein the sponson running surface comprises (a) an angled sponson running surface extending along an outer portion of the sponson running surface between (i) the keel and (ii) one of the inner chine or the outer chine for the sponson, (b) an outermost sponson running surface edge adjacent either the inner chine or the outer chine, and (c) a smooth radiused transition between the angled sponson running surface and the outermost sponson running surface edge, two longitudinal steps disposed at respectively different points along the keel and the sponson running surface, each of the two longitudinal steps running across a width $W_S$ of the first sponson or the second sponson, and two transverse steps disposed lengthwise on opposing sides of the keel, wherein a first transverse step of the two transverse steps being disposed between the keel and the inner chine of the first sponson or the second sponson, and wherein a second transverse step of the two transverse steps being disposed between the keel and the outer chine of the first sponson or the second sponson, wherein the two longitudinal steps divide the sponson running surface into an aft sponson running surface section, a mid-hull sponson running surface section, and a forward hull sponson running surface section, wherein each of the two longitudinal steps has a step edge profile along opposing outer edges of the respective first sponson and the respective second sponson, wherein the step edge profile comprises at least one of:

(i) a curved longitudinal step portion disposed on the opposing outer edges with an outer edge portion of the curved longitudinal step portion being further away from aft transom section, and (ii) an inward step edge offset where each of the two longitudinal steps meets a side of the respective first sponson and the respective second sponson, wherein the two transverse steps divide the aft sponson running surface section into an inner lifting pad running portion and two outer running surface portions, the inner lifting pad running portion of the aft sponson running surface being disposed between each of the outer running surface portions of the aft sponson running surface section as separated by each of the two transverse steps, wherein the inner lifting pad running portion having a variable deadrise profile with a lower deadrise at an aft end of the inner lifting pad running portion that transitions to a higher deadrise at a forward end of the inner lifting pad running portion.

29. The catamaran boat hull of claim 28, wherein the smooth radiused transition is characterized by a transition angle $\angle T$ between the angled sponson running surface and the outermost sponson running surface edge, wherein the smooth radiused transition comprises a smooth arc-shaped curve surface disposed between the angled sponson running surface and the outermost sponson running surface edge.

30. The catamaran boat hull of claim 29, wherein the transition angle $\angle T$ is from about 150° to about 157°; and wherein the smooth arc-shaped curve surface has a curve length $L_C$ of from about 1.0 in to about 6.0 in.

* * * * *